(12) United States Patent
Mohammed et al.

(10) Patent No.: US 7,664,882 B2
(45) Date of Patent: Feb. 16, 2010

(54) SYSTEM AND METHOD FOR ACCESSING MULTIMEDIA CONTENT

(75) Inventors: Sohail Baig Mohammed, Redmond, WA (US); Alexandre V. Grigorovitch, Redmond, WA (US); Kirt A. Debique, Seattle, WA (US); Rebecca C. Weiss, Menlo Park, CA (US); Sumedh N. Barde, Redmond, WA (US); Miguel M. Valdez, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 840 days.

(21) Appl. No.: 10/829,503

(22) Filed: Apr. 22, 2004

(65) Prior Publication Data

US 2005/0188413 A1    Aug. 25, 2005

Related U.S. Application Data

(60) Provisional application No. 60/546,460, filed on Feb. 21, 2004.

(51) Int. Cl.
  *G06F 15/16* (2006.01)
(52) U.S. Cl. .................................... 709/250; 709/231
(58) Field of Classification Search ................. 725/112; 709/250, 223
  See application file for complete search history.

(56) References Cited

U.S. PATENT DOCUMENTS

| 5,140,437 | A | 8/1992 | Yonemitsu et al. |
|---|---|---|---|
| 5,420,801 | A | 5/1995 | Dockter et al. |
| 5,528,281 | A | 6/1996 | Grady et al. |
| 5,539,886 | A | 7/1996 | Aldred et al. |
| 5,546,584 | A | 8/1996 | Lundin et al. |
| 5,574,934 | A | 11/1996 | Mirashrafi et al. |
| 5,577,258 | A | 11/1996 | Cruz et al. |
| 5,604,843 | A | 2/1997 | Shaw et al. |
| 5,625,404 | A | 4/1997 | Grady et al. |
| 5,675,752 | A | 10/1997 | Scott et al. |
| 5,712,906 | A | 1/1998 | Grady et al. |
| 5,764,965 | A | 6/1998 | Poimboeuf et al. |
| 5,765,011 | A | 6/1998 | Wilkinson et al. |
| 5,786,814 | A | 7/1998 | Moran et al. |
| 5,802,283 | A | 9/1998 | Grady et al. |
| 5,815,689 | A | 9/1998 | Shaw et al. |
| 5,878,431 | A | 3/1999 | Potterveld et al. |
| 5,886,274 | A | 3/1999 | Jungleib |
| 5,887,139 | A | 3/1999 | Madison, Jr. et al. |

(Continued)

FOREIGN PATENT DOCUMENTS

EP    0784271 (A2)    7/1997

(Continued)

OTHER PUBLICATIONS

Chatterjee, et al., "Microsoft DirectShow: A New Media Architecture", SMPTE Journal, Dec. 1997, pp. 865-871.

(Continued)

*Primary Examiner*—Vivek Srivastava
*Assistant Examiner*—Ryan J Jakovac
(74) *Attorney, Agent, or Firm*—Lee & Hayes, PLLC

(57) ABSTRACT

Systems and methods described herein provide access to multimedia content of varying types from a variety of sources using a uniform resource locator (URL).

48 Claims, 4 Drawing Sheets

U.S. PATENT DOCUMENTS

| | | | |
|---|---|---|---|
| 5,892,767 A | 4/1999 | Bell et al. | |
| 5,936,643 A | 8/1999 | Tindell et al. | |
| 5,987,628 A | 11/1999 | Von Bokern et al. | |
| 5,995,512 A | 11/1999 | Pogue, Jr. | |
| 5,996,015 A | 11/1999 | Day et al. | |
| 6,014,706 A | 1/2000 | Cannon et al. | |
| 6,038,625 A | 3/2000 | Ogino et al. | |
| 6,044,408 A | 3/2000 | Engstrom et al. | |
| 6,178,172 B1 | 1/2001 | Rochberger | |
| 6,185,612 B1 | 2/2001 | Jensen et al. | |
| 6,192,354 B1 | 2/2001 | Bigus et al. | |
| 6,209,041 B1 | 3/2001 | Shaw et al. | |
| 6,243,753 B1 | 6/2001 | Machin et al. | |
| 6,262,776 B1 | 7/2001 | Griffits | |
| 6,263,486 B1 | 7/2001 | Boezeman et al. | |
| 6,266,053 B1 | 7/2001 | French et al. | |
| 6,279,029 B1 | 8/2001 | Sampat et al. | |
| 6,308,216 B1 | 10/2001 | Goldszmidt et al. | |
| 6,317,131 B2 | 11/2001 | Basso et al. | |
| 6,321,252 B1 | 11/2001 | Bhola et al. | |
| 6,343,313 B1 | 1/2002 | Salesky et al. | |
| 6,347,079 B1 | 2/2002 | Stephens et al. | |
| 6,369,835 B1 | 4/2002 | Lin | |
| 6,385,201 B1 | 5/2002 | Iwata | |
| 6,389,467 B1 * | 5/2002 | Eyal | 709/223 |
| 6,430,526 B1 | 8/2002 | Toll | |
| 6,466,971 B1 | 10/2002 | Humpleman et al. | |
| 6,536,043 B1 | 3/2003 | Guedalia | |
| 6,539,163 B1 | 3/2003 | Sheasby et al. | |
| 6,546,426 B1 | 4/2003 | Post | |
| 6,549,932 B1 | 4/2003 | McNally et al. | |
| 6,581,102 B1 | 6/2003 | Amini et al. | |
| 6,594,699 B1 | 7/2003 | Sahai et al. | |
| 6,594,773 B1 | 7/2003 | Lisitsa et al. | |
| 6,618,752 B1 | 9/2003 | Moore et al. | |
| 6,625,643 B1 | 9/2003 | Colby et al. | |
| 6,658,477 B1 | 12/2003 | Lisitsa et al. | |
| 6,684,331 B1 | 1/2004 | Srivastava | |
| 6,687,664 B1 | 2/2004 | Sussman et al. | |
| 6,691,312 B1 | 2/2004 | Sen et al. | |
| 6,694,368 B1 | 2/2004 | An et al. | |
| 6,711,171 B1 | 3/2004 | Dobbins et al. | |
| 6,725,274 B1 | 4/2004 | Slik | |
| 6,725,279 B1 | 4/2004 | Richter et al. | |
| 6,757,735 B2 | 6/2004 | Apostolopulos et al. | |
| 6,802,019 B1 | 10/2004 | Lauder | |
| 6,810,526 B1 | 10/2004 | Menard et al. | |
| 6,823,225 B1 | 11/2004 | Sass | |
| 6,920,181 B1 | 7/2005 | Porter | |
| 6,957,430 B2 | 10/2005 | Fant et al. | |
| 6,975,752 B2 | 12/2005 | Dixon et al. | |
| 7,024,483 B2 | 4/2006 | Dinker et al. | |
| 7,035,858 B2 | 4/2006 | Dinker et al. | |
| 7,047,554 B1 | 5/2006 | Lortz | |
| 7,076,564 B2 | 7/2006 | To et al. | |
| 7,124,424 B2 | 10/2006 | Gordon et al. | |
| 7,139,925 B2 | 11/2006 | Dinker et al. | |
| 7,197,535 B2 | 3/2007 | Salesky et al. | |
| 7,206,854 B2 | 4/2007 | Kauffman et al. | |
| 7,240,325 B2 | 7/2007 | Keller | |
| 7,246,318 B2 | 7/2007 | Debique et al. | |
| 7,290,057 B2 | 10/2007 | Saunders et al. | |
| 7,299,485 B2 | 11/2007 | Chaney et al. | |
| 7,330,542 B2 | 2/2008 | Kauhanen et al. | |
| 7,415,537 B1 | 8/2008 | Maes | |
| 7,426,637 B2 | 9/2008 | Risan et al. | |
| 2001/0000962 A1 | 5/2001 | Rajan | |
| 2001/0024455 A1 | 9/2001 | Thaler et al. | |
| 2002/0051017 A1 | 5/2002 | Wishoff | |
| 2002/0085581 A1 | 7/2002 | Hauck et al. | |
| 2002/0099842 A1 | 7/2002 | Jennings | |
| 2002/0123997 A1 | 9/2002 | Loy et al. | |
| 2002/0158897 A1 | 10/2002 | Besaw et al. | |
| 2002/0174425 A1 | 11/2002 | Markel et al. | |
| 2002/0199031 A1 * | 12/2002 | Rust et al. | 709/315 |
| 2003/0028643 A1 | 2/2003 | Jabri | |
| 2003/0033424 A1 * | 2/2003 | Gould | 709/233 |
| 2003/0056029 A1 | 3/2003 | Huang et al. | |
| 2003/0093568 A1 | 5/2003 | Deshpande | |
| 2003/0095504 A1 | 5/2003 | Ogier | |
| 2003/0101253 A1 | 5/2003 | Saito et al. | |
| 2003/0123659 A1 | 7/2003 | Forstrom et al. | |
| 2003/0146915 A1 | 8/2003 | Brook et al. | |
| 2003/0149772 A1 | 8/2003 | Hsu et al. | |
| 2003/0158957 A1 | 8/2003 | Abdolsalehi | |
| 2003/0177292 A1 * | 9/2003 | Smirnov et al. | 710/30 |
| 2003/0215214 A1 | 11/2003 | Ma | |
| 2003/0231867 A1 | 12/2003 | Gates et al. | |
| 2003/0236892 A1 | 12/2003 | Coulombe | |
| 2003/0236906 A1 * | 12/2003 | Klemets et al. | 709/231 |
| 2004/0001106 A1 | 1/2004 | Deutscher et al. | |
| 2004/0004631 A1 | 1/2004 | Debique et al. | |
| 2004/0031058 A1 | 2/2004 | Reisman | |
| 2004/0042413 A1 | 3/2004 | Kawamura et al. | |
| 2004/0073596 A1 | 4/2004 | Kloninger et al. | |
| 2004/0073912 A1 | 4/2004 | Meza | |
| 2004/0080504 A1 | 4/2004 | Salesky et al. | |
| 2004/0139157 A1 | 7/2004 | Neely, III et al. | |
| 2004/0177162 A1 | 9/2004 | Wetzel et al. | |
| 2004/0207723 A1 | 10/2004 | Davis et al. | |
| 2004/0208132 A1 | 10/2004 | Neulist et al. | |
| 2004/0220926 A1 | 11/2004 | Lamkin et al. | |
| 2004/0230659 A1 | 11/2004 | Chase | |
| 2004/0236945 A1 | 11/2004 | Risan et al. | |
| 2004/0267778 A1 | 12/2004 | Rudolph et al. | |
| 2004/0267899 A1 | 12/2004 | Rahman et al. | |
| 2004/0267953 A1 | 12/2004 | Dunbar et al. | |
| 2004/0268224 A1 | 12/2004 | Balkus et al. | |
| 2004/0268357 A1 | 12/2004 | Joy et al. | |
| 2004/0268407 A1 | 12/2004 | Sparrell et al. | |
| 2005/0005025 A1 | 1/2005 | Harville et al. | |
| 2005/0018775 A1 | 1/2005 | Subramanian et al. | |
| 2005/0055517 A1 | 3/2005 | Olds et al. | |
| 2005/0066082 A1 | 3/2005 | Forin et al. | |
| 2005/0081158 A1 | 4/2005 | Hwang | |
| 2005/0125734 A1 | 6/2005 | Mohammed et al. | |
| 2005/0132168 A1 | 6/2005 | Weiss et al. | |
| 2005/0172309 A1 | 8/2005 | Risan | |
| 2005/0188311 A1 | 8/2005 | Diesel et al. | |
| 2005/0198189 A1 | 9/2005 | Robinson et al. | |
| 2005/0204289 A1 | 9/2005 | Mohammed et al. | |
| 2005/0226324 A1 | 10/2005 | Ouyang et al. | |
| 2005/0262254 A1 | 11/2005 | Sherwani | |
| 2007/0011321 A1 | 1/2007 | Huntington et al. | |
| 2008/0037957 A1 | 2/2008 | Nallur et al. | |
| 2008/0154407 A1 | 6/2008 | Carson | |

FOREIGN PATENT DOCUMENTS

| | | |
|---|---|---|
| EP | 0814403 (A1) | 12/1997 |
| JP | 2002514797 | 5/2002 |
| WO | WO9621189 (A1) | 7/1996 |
| WO | WO9957837 A2 | 11/1999 |

OTHER PUBLICATIONS

Cline, et al., "DirectShow RTP Support for Adaptivity in Networked Multimedia Applications", IEEE, 1998, pp. 13-22.

Dunn, et al., "The Design and Implementation of JaDiSM", pp. 1-38, Dec. 4, 2001.

Olson, Robert, et al., "Remote Rendering Using Vtk and Vic," website at http://www-unix.mcs.anl.gov/fl/publications/vis00-vicvtk.pdf, 2 pages.

Engel, Klaus et al, "Remote 3D Visualization Using Image-Streaming Techniques" website at: http://citeseer.nj.nec.com/394248.html, 4 pages.

Engel, K., et al., "Combining Local and Remote Visualization Techniques for Interactive Volume Rendering in Medical Applications" website at http://wwwvis.informatik.uni-stuttgart.de/eng/research/pub/pub2000/engel_vis00.pdf.

TGS website at http://www.tgs.com/pro_div/oiv_overview.htm, Open Inventor from TGS4.0 "Open Inventor Overview," printed Apr. 28, 2003, 4 pages.

Timothy K. Shih, "Participator Depenent Multimedia Presentation", Journal of Information Sciences, vol. 107, pp. 85-105, 1998.

Timothy K. Shih and Wen C. Pai, "A Stepwise Refinement Approach to Multimedia Presentation Designs", IEEE, pp. 117-122, 1997.

Arbab Ali Samejo et al., "Graphical User Interface Based Multimedia Web Suite in Windows Evironment", Mehran Unversity Research Journal of Engineering & Technology, vol. 20, No. 2, pp. 57-68, Apr. 2001.

Timothy Shih, et al., "A Knowledge Abstraction Approach for Multimedia Presentation", IEEE, pp. 528-532, 1997.

Sei-Hoon Lee and Chang-Jong Wang, "Open Multimedia/Hypermedia Application Development Environment", Inspec, 1996.

Chi-Ming Chung, et al., "A Control and Data Abstraction Approach for Multimedia Presentation", Journal of the Chinese Institute of Electrical Engineering, vol. 5, No. 3, pp. 265-276.

Robertson, Mark A.; Stevenson, Robert L.; "Temporal Resolution Enhancement in Compressed Video Sequences"; University of Notre Dame, Notre Dame, Indiana; Sep. 2001; pp. 1-11.

Girod, Bernd; Farber, Niko; "Feedback-Based Error control for Mobile Video Transmission"; Proceedings of the IEEE, v 87, n10, Oct. 1999; pp. 1707-1723.

Chien, Shao-Yi; Chen, Ching-Yeh; Huang, Yu-Wen; and Chen, Liang-Gee; "Multiple Sprites and Frame Skipping Techniques for Sprite Generation with High Subjective Quality and Fast Speed"; IEEE 2002; pp. 785-788.

Agarwal, et al., "The Totem Multiple-Ring Ordering and Topology Maintenance Protocol", ACM, vol. 16, No. 2, 1998, pp. 93-132.

Bao, et al., "Topology Management in Ad Hoc Networks", ACM, 2003, pp. 129-140.

Jaffe, et al., "Automatic Update of Replicated Topology Data Base", ACM, 1984, pp. 142-148.

Sullivan, et al., "Programming with the Java Media Framework", Sean C. Sullivan, Loren Winzeler, Jeanine Deagen, and Deanna Brown, 1998, pp. 99.

"How Terminal Services Works", retrieved on May 1, 2008 at <<http://technet2.microsoft.com/windowsserver/en/library/2cb5c8c9-cadc-44a9-bf39-856127f4c8271033.mspx>>, Microsoft TechNet, updated Mar. 28, 2003, pp. 1-15.

Maharaj, "A Primitive Window System Using GDI+ and C#", retrieved May 1, 2008 at <<http://web.archive.org/web/20020605051526/http://www.csharphelp.com/archives2/archive306.html>>, pp. 1-3.

Barth, et al., "Configuring Distributed Multimedia Applications Using CINEMA", retrieved on Jan. 19, 2008 at <<http://ieeeexplore.ieee.org/xpls/absprintf.jsp?arnumber=557748>> Published 2006, pp. 10.

Blome, et al., "Core Media Technology in Windows XP Empowers You to Create Custom Audio/Video Processing Components", retrieved on Sep. 22, 2009 at <<http://msdn.microsoft.com/en-us/magazine/cc301631.aspx>>, MSDN Magazine, 16 pages.

"DirectShow", retrieved on Sep. 22, 2009 at <<http://www.gdcl.co.uk/dshow.htm>>, Archived Oct. 17, 2002, 12 pages.

"EvCode.h", retrieved on Sep. 22, 2009 at <<http://www.lelandnsmith.com/downloads/Microsoft/DirectX%209%20SDK/sdk/Include/evcode.h>>, Microsoft, 2001, pp. 1-6.

"GstEvent", retrieved on Sep. 22, 2009 at <<http://www.gstreamer.net/docs/gstreamer/gstreamer-bstevent.html>>, GStreamer Core Reference Manual, Archived Apr. 29, 2003, pp. 1-14.

"IFileSourceFilter Interface", retrieved on Sep. 22, 2009 at <<http://msdn.microsoft.com/en-us/library/dd389981(VS.85,printer).aspx>>, MSDN, Microsoft, Jul. 13, 2009, 4 pages.

Taymans, et al., "GStreamer Application Development Manual", retrieved on Sep. 22, 2009 at <<http://www.gstreamer.net/docs/gstreamer-manual.pdf>>, Archived Apr. 5, 2003, pp. i-iv and 1-84.

Thompson, "DirectShow for Media Playback in Windows", retrieved on Sep. 22, 2009 at <<http://www.flipcode.com/archives/DirectShow_For_Media_Playback_In_Windows-Part_I_Basics.shtml>>, Parts 1-3, Last Part Dated Sep. 13, 200, 18 pages.

* cited by examiner

SYSTEM AND METHOD FOR ACCESSING MULTIMEDIA CONTENT

RELATED APPLICATIONS

This application claims the benefit to U.S. Provisional application Ser. No. 60/546,460, filed Feb. 21, 2004. Additionally, this application is related to the following U.S. patent applications, each of which is hereby incorporated herein by reference, and each of which is assigned to the assignee of the present application: U.S. patent application Ser. No. 10/730,735, filed Dec. 8, 2003, to Mohammed et al., and titled "Media Processing Methods, Systems and Application Program Interfaces"; U.S. patent application Ser. No. 10/185,161, to Kirt Debique, et al, filed Jun. 28, 2002, and titled "Application Programming Interface for Utilizing Multimedia Data"; U.S. patent application Ser. No. 10/735,522, to Weiss et al., filed Dec. 11, 2003, titled "Destination Application Program Interfaces"; U.S. patent application Ser. No. 10/782,734, to Rahman, et al., filed Feb. 19, 2004, titled "Media Timeline": and U.S. Provisional application Ser. No. 60/546,671, to Lipe, et. al, and titled "Function Discovery".

BACKGROUND

Users of computing devices, such as desktop PCs, set-top boxes, personal digital assistants (PDAs), and so on, have access to an ever increasing amount of multimedia content (e.g., audio, video, and other assorted data). Typically, this multimedia content is accessed, manipulated and/or presented on a computing device using a multimedia application running on the device.

Multimedia content may be accessed from a variety of different sources, in a variety of different formats, using a variety of different communications protocols. Programming each of the different applications to individually determine basic information regarding the multimedia content requires duplicated efforts and undesirably wastes time, costs, and resources that are required to individually program the multimedia applications. In addition, most current applications do not provide an extensibility mechanism to allow for new types of sources or formats. Accordingly, there is currently a need in the art for improved methods for enabling multimedia applications to access and process multimedia data without the applications having to individually interpret and determine the characteristics of the multimedia content directly.

One underlying problem with using typical multimedia applications is that in order to access multimedia content, however, is that there are many different types of formats, standards, and protocols that are used to encode and transmit digital data. Examples of different formatting standards include, for example, MPEG (Moving Picture Experts Group), ASF (Advanced Streaming Format), AVI (Audio Video Interleave), Active Movie, Cinepaq, QuickTime, Indeo, ATVEF (Advanced Television Enhancement Forum) and ATSC (Advanced Television Systems Committee).

Examples of different protocols and languages include RTSP (Real-Time Streaming Protocol), RTP (Real-Time Protocol), RTCP (Real-Time Control Protocol), UDP (User Datagram Protocol), HTTP (Hypertext Transport Protocol), MMS (Microsoft Media Server), TCP (Transmission Control Protocol), XML (extensible Markup Language), and SMIL (Synchronized Multimedia Integration Language).

Accordingly, the large variety of different multimedia formats, standards, and protocols creates a burden on programmers for creating multimedia applications that are capable of accommodating the various standards, protocols, languages and requirements that can be used to present multimedia content. Individually programming the multimedia applications in this manner, however, is inefficient, particularly when a single computing system is configured with multiple applications that must each be programmed to interpret certain basic information of the multimedia content. For instance, it may be necessary for the applications to each determine what protocol to use to read the data, and once the data are being read, the format of the data.

Programming each of the different applications to individually determine how the multimedia content should be read and what format it is requires duplicated efforts and undesirably wastes time, costs, and resources that are required to individually program the multimedia applications. Accordingly, there is currently a need in the art for improved methods for enabling multimedia applications to access and process multimedia data without the applications having to individually interpret and determine the format of and the best method for reading the multimedia content directly.

SUMMARY

Described herein are various systems and methods that provide access to media content of varying types from a variety of sources using a uniform resource locator (URL). In accordance with one implementation, a first object operable to access data from a location specified by a URL is selected based on a scheme of the URL. A second object operable to read media content of a given type from the location specified by the URL is then selected based on data accessed using the first object and/or file type information in the URL.

DETAILED DESCRIPTION

Figure 1:
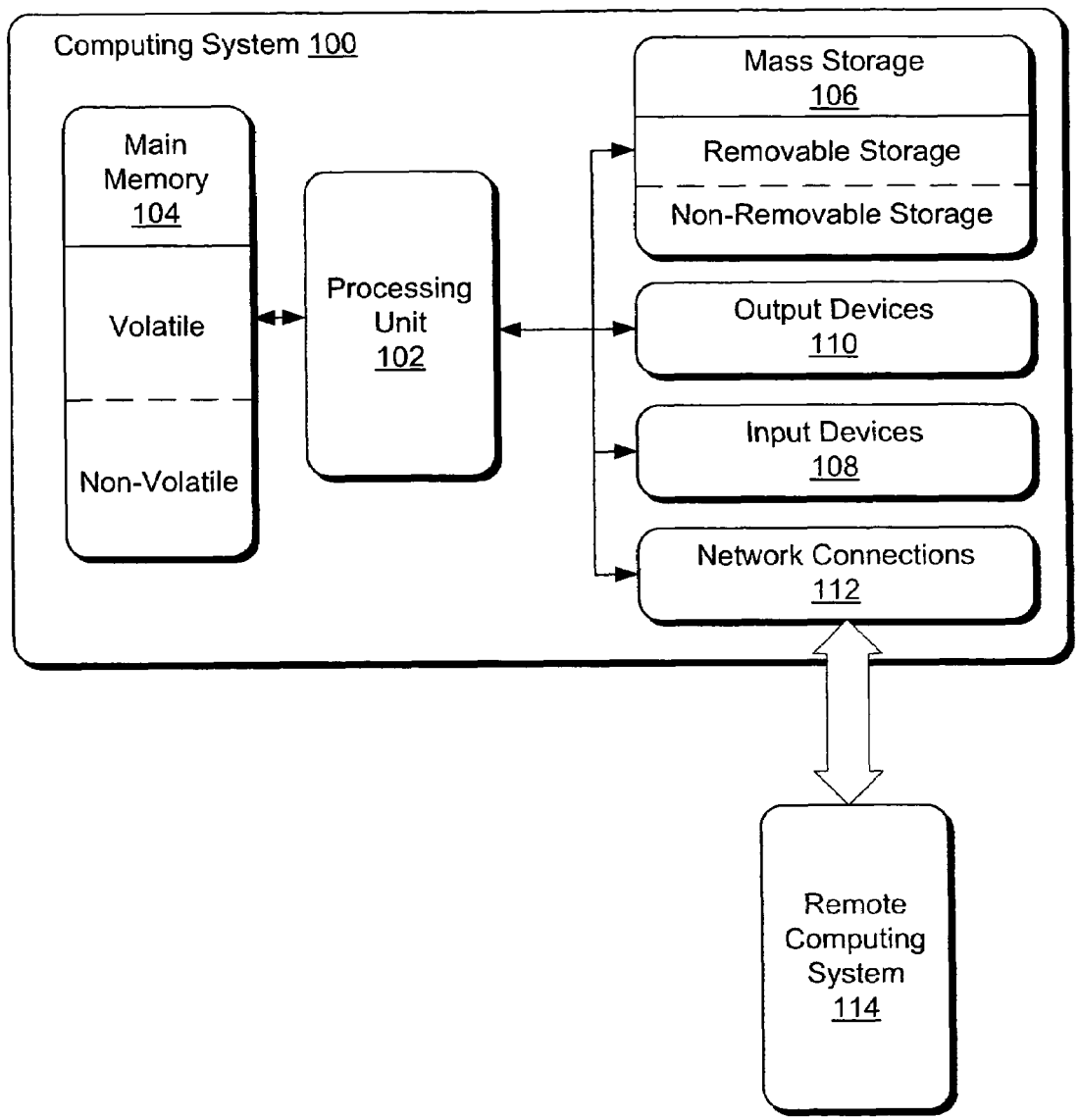
FIG. 1 is an illustration of one environment in which the systems and methods described herein may be employed.

Described herein are various implementations of systems and methods related to accessing multimedia content (referred to herein as "media content"). As will be appreciated by those skilled in the art, media content typically include some combination of audio, video, still or animated images, information related to multiple display areas on a display screen, and other associated operational data. Media content may be produced, streamed, and/or stored local (e.g., stored locally on or in some form of computer-readable media), or produced, stored, or streamed from a remote location.

More particularly, described herein are various implementations of an object selection module. In general, an object selection module is used by a media system and/or media application to select an appropriate mechanism (e.g., source object or byte stream object) by which desired media content may be accessed. As described fully below, the object selection module makes these selection based on information contained is a Uniform Resource Locator (URL) that specifies a location of the desired media content and/or file type information in the URL.

Before discussing the object selection module in detail, an example of a computing system 100 in which an object selection module may be implemented will be described with respect to FIG. 1. In its most basic configuration, the computing system 100 includes a processing unit 102 and main memory 104, including volatile and/or non-volatile memory. Additionally, the computing system 100 may include or have access to various mass storage devices or systems 106, including various removable and/or non-removable mass storage devices. Examples of mass storage devices might be, without limitation, various magnetic, optical, and/or non-volatile semiconductor memory, etc. In the case where the mass storage device comprises a number of storage devices, those devices may be distributed, such as across a computer network.

The computing system 100 may have input devices 108, such as a keyboard, a pointing device (mouse), various optical scanners or readers, microphones, video cameras, or various other computer input devices. The computing system 100 may also have output devices 110, such as display devices, speakers, printers, or various other computer output devices. Other aspects of the computing system 100 may include network or communications connections 112 to other devices, computers, networks, servers, etc., using either wired or wireless computer-readable media. For example, the computing system 100 is shown in FIG. 1 as being connected to a remote computing system 114.

It should be appreciated that the remote computing system 114 may encompass various types computing systems or computing processes. For example, in one implementation, the remote computing system 114 is similar in basic structure and features to the computing system 100. Furthermore, the computing system 100 and the remote computing system 114 may be a part of, or in communication with, computer networks, such as Wide Area Networks (WAN), Local Area Network (LANs), the Internet, or any of various other computer networks.

Figure 4:
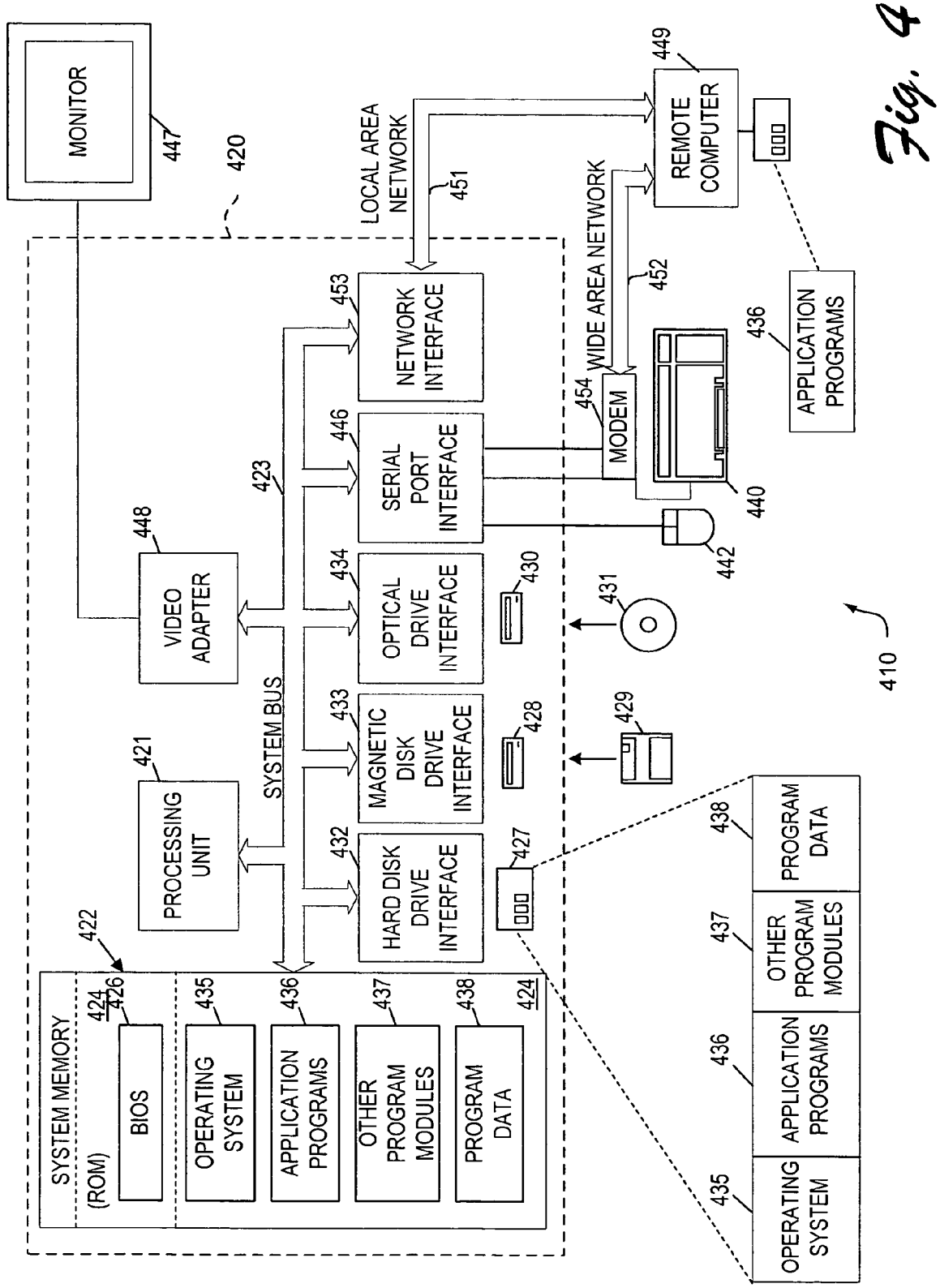
FIG. 4 illustrates another possible environment in which the systems and methods described herein may be employed.

The computing system 100 illustrated in FIG. 1 is configured as a personal computer (PC). However, the computing system 100 may also assume a variety of other configurations, such as, without limitation, a mobile station, an entertainment appliance, a set-top box communicatively coupled to a display device, a wireless phone, a video game console, a personal digital assistant (PDA), and so forth. Thus, the computing system 100 may range from a full resource device with substantial memory and processor resources (e.g., PCs, television recorders equipped with hard disk, etc.) to a low-resource device with limited memory and/or processing resources (e.g., a traditional set-top box). A more comprehensively described example of a computing system 400 in which the system and methods described herein may be implemented is shown in FIG. 4.

Figure 2:
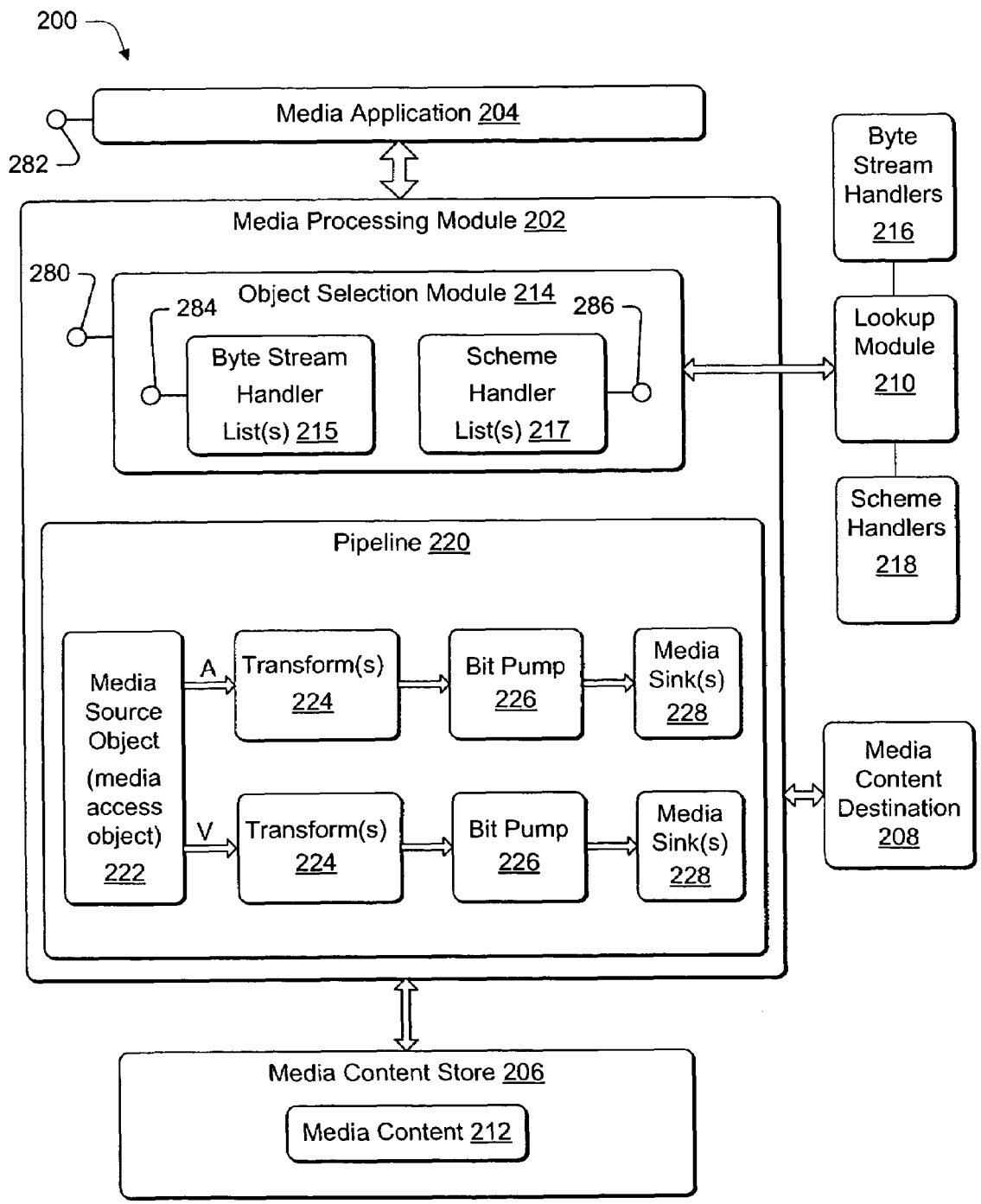
FIG. 2 is a high level block diagram of one possible multimedia presentation system in which the various systems and methods described herein may be employed.

FIG. 2 illustrates one of many possible media processing environments 200 such as a component object-based multimedia framework in which the storage, transmission, and/or presentation of media content may take place. Likewise, FIG. 2 illustrates one of many possible media processing environments 200 in which various implementations of an object selection module, may be employed, as will now be discussed.

Included in the media processing environment 200 is a media processing module 202, a media application 204, a media content store 206, a media content destination 208, and a lookup module 210, a number of byte stream handlers 216, and a number of scheme handlers 218. The details of each of these elements of the media processing environment are described below. However, in general terms, the media processing module 202 obtains and processes media content 212 from the media content store 206 via a source object, processes the media content 212 in some manner, and outputs the processed media content to the media content destination 208 via media sinks 228, in accordance with directions or requests from the media application 204.

Turning now more particularly to the form and function of the elements of the media processing environment, the media application 204 may be any type of multimedia software application that does playback, archiving/encoding, editing, or any other presentation or manipulation of multimedia content. In operation, the application 204 may indicate the location of media content to be accessed, configure the media processing module 202 to processes the media content in a particular manner, and instruct the media processing module as to the media content destination 208 that specifies where the processed media content is to be sent and/or rendered.

The media content store 206 may be any of a number of systems or mechanisms from which media content 202 may be accessed by the media processing module 202. For example, and without limitation, the media store 206 may be some form of computer-readable medium on a computer system, either local or remote to the computer system including the media application. Media Store 206 may also refer to content that is live, i.e. in the process of being created during the presentation. The media store 206 might also be an application, system, or device, either local or remote, from which media content is streamed. While the precise form of the media content store 206 may vary, in accordance with the various systems and methods described herein, there is some mechanism by which media content may be located and accessed using a URL; this mechanism may be specific to the media content store.

A media content destination 208 is an object or API that defines where media content is to be presented (e.g. a window, disk file, and the like) and what happens to the media content. In accordance with various implementations, the application 204 itself may create the media content destination 208. Typically, the media content destination 208 will be associated with and receive processed media content from one or more media sinks (described below) in the media processing module 202. A more detailed description of media content destinations may be had with reference to U.S. patent application titled "Destination Application Program Interfaces," having Ser. No. 10/735,522, filed Dec. 11, 2003, incorporated herein by reference.

The lookup module 210 is an application or process that is used by the object selection module 214, such as the media processing module 202, to compile a list or lists 215 of byte stream handlers 216 and/or a list or lists 217 of scheme handlers 218. (Byte stream handlers 216 and scheme handlers 218 are described in detail below.) As used herein, the term "list" describes any type of data structure or other mechanism by which scheme handlers and byte stream handlers may be associated or grouped, either directly or by reference. Generally, the lookup module 210 uses information contained in a URL and/or information read from the location pointed to by a URL in compiling lists.

The information from a URL that is used by the lookup module 210 may include information concerning or characterizing the media content pointed to by the URL. Likewise, information read from the location pointed to by the URL may include information concerning or characterizing the media content pointed to by the URL. This information is then used by the lookup module 210 to create the lists of byte stream handlers 216 and/or scheme handlers 218.

The lookup module 210 may use various logic or mechanisms to create the list or lists of byte stream handlers 216 and/or scheme handlers 218. In some implementations, the lookup module 210 uses the scheme of a URL, in conjunction with a lookup table, which associates schemes with scheme handlers, to select scheme handlers that produce objects that may be suitable for accessing the media content pointed to by the URL. Likewise, the lookup module 210 may use other select information included in the URL and/or read from the location pointed to by the URL, in conjunction with a lookup table, which associates the information with byte stream handlers, to select byte stream handlers that produce objects that may be suitable for accessing the media content pointed to by the URL.

In other implementations, the lookup module 210 may employ other mechanisms to create the lists of stream handlers 216 and/or scheme handlers 218. For example, in accordance with one implementation, the lookup module 210 uses a "function discovery" process or mechanism to create the lists. A complete description of the operations of the function discovery process are set forth in U.S. provisional application Ser. No. 60/546,671, filed Feb. 20, 2004, to Lipe et. al, and titled "Function Discovery", which is incorporated herein by reference. Various functions of the lookup module 210 are described in more detail below with respect to FIG. 3. As used within the scope of this invention, function discovery serves as a store from which Scheme Handlers and Byte Stream Handlers can be enumerated and instantiated and from which various properties associated with those handlers can be retrieved.

In accordance with one implementation, scheme handlers and byte stream handlers comprise Component Object Model (COM) objects. As will be appreciated by those skilled in the art, a COM is a component software architecture from Microsoft Corporation which defines a structure for building program routines or objects that can be called up and executed in a Microsoft Windows® operating system environment. In this implementation, Function discovery instantiates the scheme handlers and byte stream handlers via COM's CoCreateInstance function.

Additionally, the lookup module 210 may include various mechanisms by which an application or other process may register new and/or proprietary scheme handlers and/or byte stream handlers with the lookup module, such that these registered scheme handlers and byte stream handlers may be selected based on information contained in the URL and/or information accessed from the media content. In this regard, in the case where the lookup module 210 employs the function discovery processes discussed above, the function discovery provides just such a registration mechanism in the form of APIs. The function discovery APIs provide a standardized mechanism by which third parties can register their own scheme handlers and byte stream handlers, along with any associated properties, so that they get included in the enumeration and will therefore be considered by object selection module 214.

In general, the media processing module 204 acts as a central media content control and/or processing point for the application. In at least one implementation, the media processing module 202 exposes various components included therein to the application 204 via application programming interfaces (APIs). The media processing module 202 may also expose services via APIs by which the media application 204 may configure these components. In this way, the media processing system 202 abstracts away from the application 204 the specific details of the existence of, and interactions between, the various components being used by the media processing module 202 in the processing and/or delivery of media content.

In accordance with at least one implementation, the media processing module 202 comprises a media engine, which is a functional component within an operating system of a computing system. More particularly, in accordance with at least one implementation, the media processing module 202 comprises a media engine in a media foundation platform, as described in detail in U.S. patent application titled "Media Processing Methods, Systems and Application Program Interfaces," having Ser. No. 10/730,735, filed Dec. 8, 2003, which is incorporated herein by reference.

As shown, the media processing module 202 includes a number of components including an object selection module 214 and a component pipeline 220, such as a component object-based pipeline. As noted above, the object selection module 214 operates, in conjunction with the lookup module 210, to select appropriate source objects for accessing media content. As shown in FIG. 2, the object selection module 214 maintains one or more byte stream handler lists 215 and one or more scheme handler lists 217. The operations of the object selection module 214 are described in detail below.

Generally, the pipeline 220 includes various media content processing objects, each of which perform some form of media content processing or handling. The pipeline may include any number and/or type of media content processing objects, connected in various ways. However, with respect to the implementations described herein, the pipeline includes at least one source object for accessing media content. Details regarding the form and function of source objects, and how they are selected for inclusion in the pipeline, are set forth below.

Included in the example pipeline 220 shown in FIG. 2 are one or more source objects 222, one or more transform objects 224, one or more of bit pumps 226, and one or more media sinks 228. Each component of the pipeline 220 provides some sort of processing or handling of media data. Generally, the source object 222 accesses media content from a media content store, and reads and parses the media content into one or more streams of data. For example, in the particular implementation of a pipeline shown in FIG. 2, the source object parses the media content data into two streams of data, a video stream and an audio stream.

Each stream of data may be handled or processed in some form by one or more transforms. As will be appreciated by those skilled in the art, there are various types of processing that may be carried out by such transforms with respect media content. As such, many different types of transforms may be included in a transforms 224, and any number of (including zero) transforms may be applied to the stream. For example, and without limitation, individual transforms may perform such functions as encoding, decoding, hue adjusting, contrast adjusting, equalization, frame rate adjusting, transition effects (wipes, fades, crossovers), surround sound spatialization, and so on.

Once the data in a stream has been processed by the transforms 224, the processed streams are passed via bit pumps 226 to corresponding media sinks 228. In general, media sinks are responsible for sending the (possibly transformed) multimedia data to wherever or whatever is specified by media application 204 in the media content destination 208. For example, in a playback application, the destination may indicate a window, and the media sinks would be audio and video renderers that send the multimedia data to devices; in an encoding application, the destination may indicate a file to which the encoded bits are to be archived, and the media sinks would be responsible for arranging these bits in the appropriate format and writing to the file, etc.

A more detailed description of the form and function of pipelines and various pipeline components included in pipelines may be had with reference to U.S. patent application titled "Media Processing Methods, Systems and Application Program Interfaces," having Ser. No. 10/730,735, filed Dec. 8, 2003, which is incorporated herein by reference.

As previously noted, the media processing module 202 obtains and processes media content 212 using the source object 222. More particularly, in a typical operational scenario, the application 204 requests the media processing module 204 to provide access to and/or manipulation of particular media content from a particular media content store 206, to transform the data, and to send the data to media sinks 228, as specified by destination 208.

Turning now more particularly to the manner in which source objects are selected by the media processing module 202, in making a request for particular media content, the application 204 provides to the media processing module 202 the location of the media content in the form of URL. Once given the location (URL) of the media content 212, the media processing module 202 then invokes the object selection module 214 to select or create, using the lookup module 210, an appropriate object (media access object 222) for accessing (and potentially interpreting) the desired media content from the location specified by the URL.

The preceding paragraph describes just one of the ways in which the object selection module may be invoked. To illustrate that this can be generalized, consider the following example. One example of a media source is the timeline source. Timeline sources are described in detail in U.S. patent application Ser. No. 10/782,734, titled "Media Timeline," incorporated herein by reference. Timeline sources are used to play metafiles like ASX, M3U, and other type of metafiles, which contain a list of URLs specifying locations including media content that is to be played in a certain order. For each URL in the metafile, the timeline source uses the same object selection module 214 as described in the previous paragraph to create an underlying source. The application 204 and the media processing module 202 are unaware, in a programmatic sense, of this process. There may be other modules that implement the same interface as the object selection module 202. The application 204 or other objects may use these special implementations for certain dedicated scenarios.

Before described the manner or manners in which the object selection module 214 selects or invokes an appropriate object, it will be helpful to first to describe in more detail the various handlers and an objects that may be selected or used by the object selection module 214, as well as discussing the form and format of URLS.

In general, a byte stream object is a software module or API that includes appropriate logic and/or data for accessing media content from a given location and in accordance with a particular access method, such as a particular communications protocol. More particularly, a byte stream object is pointed to a particular location/medium from which data are available and produces as output a stream of bits that can be read by a component using the byte stream. A byte stream object is a useful abstraction that provides a component using them with a way of reading data from a medium, possibly over a certain protocol, without that component understanding, in a programmatic sense, the particulars of how to obtain data from that medium.

A source object may be any of a variety of objects that include appropriate logic and/or data to access the specific type or format of data stored at the location pointed to by the URL. More particularly, in accordance with various implementations described herein, a source object may be one of two types, a simple source object that accesses one instance of media content or a timeline source object, described above, that accesses multiple instances of media content, which are to be invoked in a given temporal order. In at least one implementation, the timeline source creates a source object for each instance of content and uses those created source objects to access the media data.

In general, a source object is a software module or API that is operable to access media content of a particular format, from a given location, and in accordance with a particular access method, such as a particular communications protocol. More particularly, a source object reads media content and produces output streams. In so doing, a source object performs format-specific parsing to produce streams of data that are then sent through the other components in the pipeline 220, and on to the media content destination 208. A more detailed explanation of source objects may be had with reference to U.S. patent application Ser. No. 10/185,161, filed Jun. 28, 2002, by Kirt Debique, et al., titled "Application Programming Interface for Utilizing Multimedia Data," which is incorporated herein by reference.

Generally, a scheme handler 218 is a software module that takes as input a URL and is able to produce a byte stream object that will allow bits to be read from that URL. Components using the byte stream object output by a scheme handler need not understand, in a programmatic sense, how to access the data from wherever the URL is pointing or to communicate via the protocol that may be defined by that URL. Alternatively, a scheme handler may be able to glean enough information from the URL to produce a source object. Typically, a particular scheme handler will be tied to a specific medium and/or protocol, and the lookup module 210 will be able to provide a list of available scheme handlers that will among them be able to cover a wide variety of schemes. Furthermore, a scheme handler can potentially also create a timeline object that can be used by a timeline media source.

In general, a byte stream handler 216 is a software module that takes as its input a byte stream and produces as an output a source object that is capable of understanding the bits in a byte stream. Typically, a particular byte stream handler will be tied to a specific format and will be able to identify that the bits in the byte stream are for its format; if so, it will create the appropriate source object, in the form of media source object 222. The lookup module 210 will be able to provide a list of available byte stream handlers that will, among themselves, be able to understand a wide variety of formats. Furthermore, a byte stream handler can potentially also create a timeline object that can be used by a timeline media source.

Typically, a byte stream handler will attempt to validate that the given byte stream is in the appropriate format for parsing by the source object that it will create. The process by which this is done is format specific, but normally involves reading a certain amount of the byte stream and ensuring its format specific validity.

As will be appreciated by those skilled in the art, a URL is a standardized address for a resource. URLs are used to "locate" resources, by providing an abstract identification of the resource location. Having located a resource, a system may perform a variety of operations on the resource, as might be characterized by such words as "access," "update," "replace," etc. In general, only the "access" method needs to be specified for any URL scheme.

In general, URLs are written as follows: <scheme>:<scheme-specific-part>. As shown, a URL contains the name of the scheme being used (<scheme>) followed by a colon and then a string (the <scheme-specific-part>) whose interpretation depends on the scheme. Generally, a scheme indicates the resource type and/or what mechanism to use to obtain that resource. There are number of established schemes that are specified by the Internet Assigned Numbers Authority (IANA), 4676 Admiralty Way, Suite 330 Marina del Rey, Calif. 90292. Some examples of schemes that are specified by the IANA are: "http", "file", "gopher", "ftp", "news", "telnet", "wais", and so on. Additionally, to the schemes specified by the IANA, individuals or organizations may create and use their own schemes. Of course, for these schemes to be used the application or process using the schemes must be aware of the form of the schemes and the access methods that are associated therewith.

As with the scheme, the scheme dependent information has a specified form. The form of the scheme dependent information may vary, but typically the scheme dependent information includes an address for the machine making the resource available and the "path" to that resource. Typically, the scheme is separated from the machine address by two slashes (//), and the machine address is separated from the path with one slash (/). The path may further include information indicating various directories and sub-directories where the resource is located, the name of the resource, and, in most cases, the type of the resource, as indicated by an extension to the resource name (e.g., resource.extension).

Figure 3:
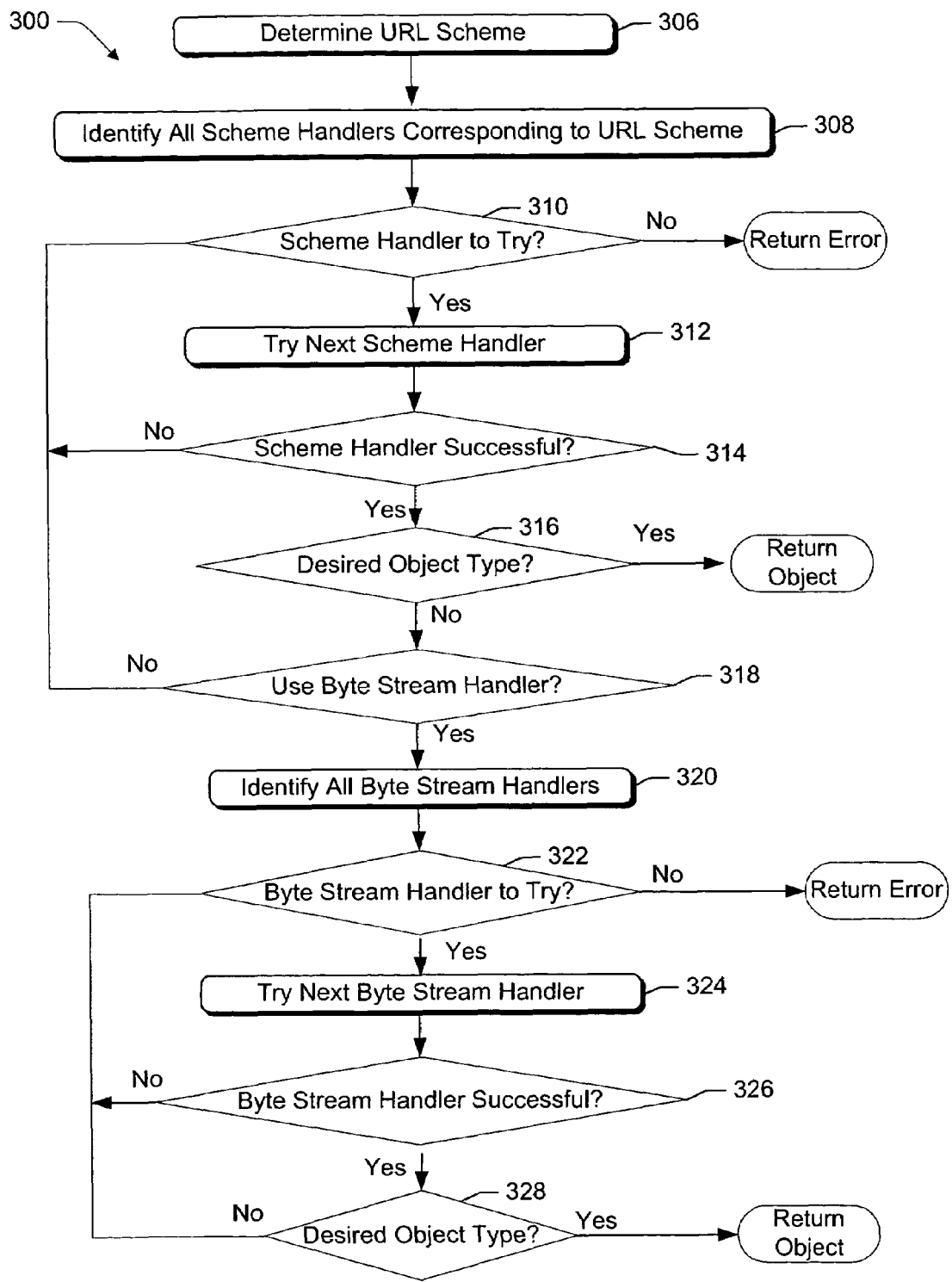
FIG. 3 illustrates one example of an operational flow including various operations for selecting a media source component.

Turning now to FIG. 3, shown therein is an operational flow 300 including various operations that may be performed by the object selection module 214 in selecting or instantiating an appropriate source object to access media content for a given URL. In accordance with various implementations, when the application requests that specific media content be played, the application will pass the media processing module, among other things, the URL of the media content. The media processing module 202 will invoke the media object selection module 214 and pass the URL and the object type to the object selection module 214; in this case, the object type desired is a Media Source. In accordance with various implementations, the object selection module 214 will then perform the operations illustrated in the operational flow 300, as will now be described.

In accordance with some implementations, the operations in the operational flow 300 will be performed entirely by the object selection module 214. In other implementations, the operations in the operational flow 300 will be performed by the object selection module in conjunction with the lookup module 210. For example, in accordance with one implementation, the lookup module will perform the identify operations 308 and/or 320 of the operations flow 300. In yet other implementations, the operations of the operational flow 300 may be performed by other processes or modules either within or in conjunction with the media processing module, or by some other process or module altogether distinct from the media processing module 202, the object selection module 214, and/or the lookup module 210.

As shown, at the beginning of the operational flow 300, a URL scheme determination 306 determines the scheme of the URL which points to the desired media content. Following the URL scheme determination operation 306, an identify scheme handlers operation 308 then uses the determined scheme to identify all available scheme handlers that are associated with the scheme of the URL. That is, all of the available scheme handlers that have been identified in some manner as being operable to read information in accordance with the identified scheme.

The manner in which the identify scheme handler operation 308 identifies the appropriate scheme handlers may be accomplished in a number of ways. For example, in accordance with one implementation, the identify scheme handler operation 308 examines a scheme handler data structure including a number of scheme types and a number of scheme handlers. In accordance with this implementation, the scheme handler data structure associates each unique scheme with all of the available scheme handlers for that scheme. The scheme handler operation then compiles a list, or the like, of the scheme handlers associated with the scheme identified in the determine URL scheme operation 306.

In accordance with another implementation, the identify scheme handler operation 308 uses a "function discovery" process to identify the appropriate scheme handlers. As previously described, the operations of the function discovery process are set forth in U.S. Provisional application Ser. No. 60/546,671, filed Feb. 20, 2004, to Lipe. et al., and titled "Function Discovery".

In accordance with various implementations, the schemes handlers identified in the identify scheme handler operation 308 may be compiled in an ordered data structure, such as an ordered list. This list may contain references to one or more scheme handlers. The list may also include no scheme handlers.

Next, a scheme handler determination operation 310 determines if the identify scheme handler operation 308 was able to find at least one appropriate scheme handler. Again, this may be done in a number of ways. For example, in implementations where the identify scheme handler operation 308 created a data structure, the scheme handler determination operation 310 may simply determine whether there are any scheme handlers in the data structure.

If the scheme handler determination operation 310 determines that there are no scheme handlers to try, an error value is returned to the caller and the operational flow 300 ends. If, however, the scheme handler determination operation 310 determines that there is at least one scheme handler to try, a try scheme handler operation 312 then tries one of the available scheme handlers. In the case where the scheme handlers are listed in an ordered data structure, the next untried scheme handler will be tried by the try scheme handler operation 312. If no untried scheme handlers are available to be tried in list, then an error value is returned to the caller In accordance with various implementations, trying a scheme handler involves invoking the scheme handler. As a result of invoking the scheme handler, one of three things may happen: a byte stream object may be produced, a source object may be produced, a timeline object may be produced, or no object will be produced. The scheme handler is invoked by using the scheme handler API/interface.

Next, a success determination operation 314 determines whether the scheme handler was successful. That is, it is determined if the scheme handler tried in operation 312 produced either a byte stream object, a source object or a timeline object. If the scheme handler tried in operation 312 did not produce either a byte stream object or a source object, the operational flow returns to the scheme handler determination operation 310. However, if the scheme handler tried in operation 312 did produce either a byte stream object, a source object, or a timeline object, a determine desired type operation 314 determines whether the type of object produced was the type of object requested by the application.

If the determine desired type operation 314 determines that the type of object produced was the type of object requested by the application, the object is returned. If, however, the determine desired type operation 314 determines that the type of object produced was not the type of object requested by the application (typically, in this case, it is a byte stream that was produced), a byte stream handler determination operation 318 then determines if a byte stream handler should be used. If the produced object is a byte stream and the requested object is a media source or timeline object, then a byte stream handler can be used to create the requested object If the byte stream handler determination operation 318 determines that a byte stream handler is not to be used the operational flow 300 returns to the scheme handler determination operation 310. However, if the byte stream handler determination operation 318 determines that a byte stream handler may be used, the operational flow proceeds to an identify all byte stream handler operation 320.

The identify byte stream handler operation 320 uses various information derived from the URL, and in some cases other information related to or present in the byte stream, to identify byte stream handlers that are associated with or identified by the information derived from the URL. For example, and without limitation, in accordance with one implementation, the identify byte stream handler operation 320 uses the extension of the URL and/or the Multi-Purpose Internet Mail Extensions (MIME) information in the byte stream to identify appropriate byte stream handlers.

The manner in which the identify byte stream handler operation 320 identifies these byte stream handlers may be accomplished in a number of ways. For example, in accordance with one implementation, the information derived from the URL is the extension portion of the URL, if available. The identify byte stream handler operation 320 then examines a byte stream handler data structure including a number of extensions and/or MIME types and a number of byte stream handlers. In accordance with this implementation, the byte stream handler data structure associates each unique extension and/or MIME type with all of the available byte stream handlers associated with that extension and/or MIME type. The identify byte stream handler operation 320 then compiles a list or lists, or the like, of the stream handlers associated with the extension identified in determine URL.

In accordance with another implementation, the identify byte stream handler operation 320 uses a "function discovery" process to identify the appropriate byte stream handlers. As previously described, the operations of the function discovery process are set forth in U.S. provisional application Ser. No. 60/546,671, filed Feb. 20, 2004, to Lipe et al., and titled "Function Discovery."

In accordance with various implementations, the byte stream handlers identified as being associated with the extension identified in the URL and/or the MIME type of the byte stream may be compiled in an ordered data structure, such as an ordered list. This list may contain references to one or more byte stream handlers. The list may also include no byte stream handlers.

The order of the byte stream handlers in the data structure in this embodiment may be selected in a number of ways. For example, in accordance with one implementation, each of the byte stream handlers will have associated therewith a predetermined cost value, which is used in the identify byte stream handler operation 320 in ordering the byte stream handlers.

The cost value may be determined in various ways and may be indicative of various properties of the byte stream handler to which it is associated. For example, in accordance with one implementation, the cost value is related to the amount of data that must be read from the byte stream before the following byte stream handler determination operation 326 can determine if the byte stream handler was successful.

In accordance with one implementation, the byte stream handlers that area associated with the extension identified in the URL and/or the MIME type of the byte stream are ordered in a single list based on the cost of the byte stream handlers. For example, in one implementation the byte stream handlers that area associated with the extension identified in the URL and/or the MIME type of the byte stream are ordered such that the following try byte stream handler operation 324 selects the untried byte stream handler having the lowest cost.

In accordance with another implementation, the byte stream handlers identified as being associated with the extension identified in the URL and/or the MIME type of the byte stream may be compiled in an ordered data structure according to cost, such as an first ordered list, while all other byte stream handlers are included in a second list. In this implementation, the following try byte stream handler operation 324 would first try the untried byte stream handler having the lowest cost from the first list. In the case where all byte stream handlers in the first list were already tried, or where there never were byte stream handlers in the first list, the try byte stream handler operation 324 would try an untried byte stream handler in the second list. In accordance with one implementation, the byte stream handlers in the second list may also be ordered according to their respective costs.

In accordance with one implementation, the caller of object selection module 314 may have specified a source resolution option indicating whether or not this second list is to be created and used. For example, electing for this option would ensure successful resolution if a WMV file is misnamed and given the incorrect extension ".mp3". In this case, the MP3 byte stream handler will not succeed on this content, since it is not in the MP3 format, but if the source resolver is allowed to try other byte stream handlers, the WMV byte stream handler will be found on the second list and will succeed on this content. However, trying the byte stream handlers on the second list is more costly than trying only those on the first list, and therefore some callers may choose not to use the second list.

Following the identify byte stream handler operation 320, a byte stream handler determination operation 322 determines if the identify byte stream handler operation 320 was able to find at least one appropriate byte stream handler. Again, this may be done in a number of ways. For example, in implementations where the identify byte stream handler operation 320 created a data structure, the byte stream handler determination operation 322 may simply determine whether there are any byte stream handlers in the data structure.

If the byte stream handler determination operation 322 determines that there are no byte stream handlers to try, an error value is returned to the user and the operational flow 300 ends. If, however, the byte stream handler determination operation 322 determines that there is at least one byte stream handler to try, a try byte stream handler operation 324 then tries one of the available byte stream handlers. In the case where the byte stream handlers are listed in an ordered data structure, the next untried byte stream handler will be tried by the try byte stream handler operation 324.

In accordance with various implementations, trying a byte stream handler involves invoking the byte stream handler on the byte stream via the byte stream handler API/Interface.

Next, a success determination operation 316 determines whether the byte stream handler was successful. That is, it is determined if the byte stream handler tried in operation 324 produced the object desired by the caller. If the byte stream handler tried in operation 324 produced an object, a determine desired type operation 328 determines whether the type of object produced was the type of object requested by the application.

If the determine desired type operation 328 determines that the type of object produced was the type of object requested by the application, the object is returned. If, however, the determine desired type operation 328 determines that the type of object produced was not the type of object requested by the application, the operational flow 300 proceeds back to the byte stream handler determination operation 322.

In accordance with one implementation, the caller of the object selection module 214 may already have a byte stream object (instead of an URL). In this case, it requests that object selection module 214 create the desired object from a byte stream. In such a case, the operational flow 300 would simply begin at the identify byte stream handler operation 320.

In accordance with one implementation, if this process fails while attempting to find an appropriate byte stream handler, the caller of object selection module 314 can request that the byte stream object that was created during the process be kept alive (cached). The caller may request this option if it wishes to subsequently try to resolve the failed URL with the "content does not have to match extension" option; this allows the second-chance resolution to take place without a second attempt to read from the URL, which may be costly.

Generally, the media processing module 202, the object selection module 214, the byte stream handlers 216, the scheme handlers 218, the components of the pipeline 220, the destination 208, and the lookup module 210 may be composed of or include computer-executable instructions, various routines, programs, objects, components, data structures, etc., that perform particular tasks or operations and/or implement particular abstract data types, ach or all of which may be embodied in or on a computer readable medium. For example, in various implementations the object selection module 214 performs the operations illustrated in FIGS. 3 and/or 4.

A computer-readable medium may include, without limitation, both volatile and nonvolatile memory, mass storage devices, and removable and non-removable media.

Any or all of the media processing module 202, the destination 208, the object selection module 214, the byte stream handlers 216, the scheme handlers 218, the components of the pipeline 220, and the lookup module 210 may be executed or implemented in a single computing device. Alternatively, any or all of the media processing module 202, the destination 208, the object selection module 214, the byte stream handlers 216, the scheme handlers 218, the components of the pipeline 220, and the lookup module 210 may be executed or implemented in a distributed computing environment, where various operations are performed by remote processing devices or systems that are linked through a communications network. For example, in accordance with one embodiment, the media processing module 202 is executed or implemented in one computing system, while the media content store 206 is implemented or present in another computing system or device.

It should be understood that while the media processing module 202, the destination 208, the object selection module 214, the byte stream handlers 216, the scheme handlers 218, the components of the pipeline 220, and the lookup module 210 are described herein as comprising computer executable instructions embodied in computer-readable media, media processing module 202, the destination 208, the object selection module 214, the byte stream handlers 216, the scheme handlers 218, the components of the pipeline 220, and the lookup module 210, and any or all of the functions or operations performed thereby, may likewise be embodied all or in part as interconnected machine logic circuits or circuit modules within a computing device. Stated another way, it is contemplated that the media processing module 202, the destination 208, the object selection module 214, the byte stream handlers 216, the scheme handlers 218, the components of the pipeline 220, and the lookup module 210 and their operations and functions, such as the operations shown and described with respect to 3 and 4, may be implemented as hardware, software, firmware, or various combinations of hardware, software, and firmware. The implementation is a matter of choice.

The previous discussion presented a system level overview of modules and components that are used in the process of accessing media content. The following discussion relates to novel APIs and data structures related to the modules and components described above. The APIs detailed below are described in terms of the C++ programming language. However, the APIs are not limited the C++ programming language. Rather, the APIs may be defined and implemented in any programming language, as those of skill in the art will recognize. The names given to the API functions and parameters which will now be described are meant to be descriptive of their function. However, other names or identifiers could be associated with the functions and parameters, as will be apparent to those of skill in the art.

In accordance with one particular implementation, the APIs are implemented with respect to the Microsoft® Component Object Model (COM). However, the APIs may likewise be implemented in a number of other ways and/or in accordance with other models. As those skilled in the art will appreciate, the Microsoft® Component Object Model (COM) is a platform-independent, distributed, object-oriented system for creating binary software components that can interact. COM is the foundation technology for Microsoft's OLE (compound documents), ActiveX (Internet-enabled components), as well as others. COM allows objects to interact across process and machine boundaries as easily as within a single process by specifying that the only way to manipulate the data associated with an object is through an interface on the object.

As used with respect to the COM implemented interfaces described herein, the term "interface" refers to an implementation in code of a COM binary-compliant interface that is associated with an object. A COM interface refers to a predefined group of related functions that a COM class implements, but a specific interface does not necessarily represent all the functions that the class supports Referring to an object implementing an interface means that the object uses code that implements each method of the interface and provides COM binary-compliant pointers to those functions to the COM library. COM then makes those functions available to any client who asks for a pointer to the interface, whether the client is inside or outside of the process that implements those functions. The various APIs set forth herein are described in a manner that is generally used with respect to the Microsoft® COM, as will be appreciated and understood by those skilled in the art.

As will be appreciated by those skilled in the art. COM interfaces typically include or inherit various methods and/or definitions from IUnknown. The IUnknown interface lets clients get pointers to other interfaces on a given object through the IUnknown::QueryInterface method, and manage the existence of the object through the IUnknown::AddRef and IUnknown::Release methods. Each of the IUnknown::

QueryInterface, The IUnknown::AddRef and IUnknown::Release methods are defined as follows:

IUnknown::Release
Release decrements the reference count for the calling interface on a object. If the reference count on the object falls to 0, the object is freed from memory.
ULONG Release(void);
Return Value
Returns the resulting value of the reference count, which is used for diagnostic/testing purposes only.
Remarks
If IUnknown::AddRef has been called on this object's interface n times and this is the n + 1th call to IUnknown::Release, the implementation of IUnknown::AddRef must cause the interface pointer to free itself. When the released pointer is the only existing reference to an object (whether the object supports single or multiple interfaces), the implementation must free the object.
IUnknown:: QueryInterface
QueryInterface returns a pointer to a specified interface on an object to which a client currently holds an interface pointer. This function calls IUnknown::AddRef on the pointer it returns.
HRESULT QueryInterface(
    REFIID iid ,
    void ** ppvObiect
);
Parameters
iid
    [in] Identifier of the interface being requested.
ppvObject
    [out] Address of pointer variable that receives the interface pointer requested in riid. Upon successful return, *ppvObject contains the requested interface pointer to the object. If the object does not support the interface specified in iid, *ppvObject is set to NULL.
Return Value
S_OK if the interface is supported E_NOINTERFACE if not.
Remarks
The QueryInterface method gives a client access to other interfaces on an object.
For any one object, a specific query for the IUnknown interface on any of the object's interfaces returns the same pointer value. This allows a client to determine whether two pointers point to the same component by calling QueryInterface on both and comparing the results. It is specifically not the case that queries for interfaces (even the same interface through the same pointer) must return the same pointer value.
There are four requirements for implementations of QueryInterface (In these cases, "must succeed" means "must succeed barring catastrophic failure."):
First, the set of interfaces accessible on an object through IUnknown::QueryInterface should be static, not dynamic. This means that if a call to QueryInterface for a pointer to a specified interface succeeds the first time, it must succeed again, and if it fails the first time, it must fail on all subsequent queries.
Second, the interface must be reflexive—if a client holds a pointer to an interface on an object, and queries for that interface, the call must succeed.
Third, the interface must be symmetric—if a client holding a pointer to one interface quenes successfully for another, a query through the obtained pointer for the first interface must succeed.
Fourth, the interface must be transitive—if a client holding a pointer to one interface queries successfully for a second, and through that pointer queries successfully for a third interface, a query for the first interface through the pointer for the third interface must succeed.
IUnknown::AddRef
IUnknown::AddRef increments the reference count for an interface on an object. It should be called for every new copy of a pointer to an interface on a given object.
ULONG AddRef(void);
Return Value
Returns an integer from 1 to n, the value of the new reference count. This information is meant to be used for diagnostic/testing purposes only, because, in certain situations, the value may be unstable.
Remarks
Objects use a reference counting mechanism to ensure that the lifetime of the object includes the lifetime of references to it. You use IUnknown::AddRef to stabilize a copy of an interface pointer. It -continued can also be called when the life of a cloned pointer must extend beyond the lifetime of the original pointer. The cloned pointer must be released by calling IUnknown::Release.
Objects must be able to maintain (2³¹)-1 outstanding pointer references. Therefore, the internal reference counter that IUnknown::AddRef maintains must be a 32-bit unsigned integer.

In accordance with one implementation, in addition to the IUnkown interface, the object selection module 214 implements one API, a source resolver interface ("IMFSourceResolver") 280 and is capable of using a caller supplied resolution callback interface ("IMFResolutionCallback") 282, as shown in FIG. 2. The IMFSourceResolver interface 280 exposes seven methods, which are defined as follows:

IMFSourceResolver:: CreateObjectFromURL
The CreateObjectFromURL method provides a synchronous way of creating a resolution object from the specified URL.
Syntax
    HRESULT CreateObjectFromURL(
        [in] LPCWSTR pwszURL,
        [in] DWORD dwFlags,
        [in] IPropertyStore *pProps,
        [out] MFOBJECT_TYPE *pObjectType,
        [out] IUnknown **ppObject
Parameters
pwszURL
    [in] Pointer to URL to be resolved.
dwFlags
    [in] Specifies resolution flags. See resolution flags section.
pProps
    [in] Holds the optional property store object that gets passed to the underlying scheme and byte stream handlers. It can also contain source resolver flags under the property key of MFPKEY_Resolution_Flags. If a property store it not to be used, then this parameter should be set to NULL.
pObject Type
    [out] Specifies type of object that is being returned. Possible values are:
        MF_OBJECT_MEDIASOURCE
        MF_OBJECT_BYTESTREAM
        MF_OBJECT_PLAYLIST
        MF_OBJECT_TIMELINE
        MF_OBJECT_INVALID
ppObject
    [out] Holds the object that is being returned.
Return Values
If the method succeeds, it returns S_OK. If it fails, it returns an error code.
Remarks
None.
IMFSourceResolver::CreateObjectFromByteStream
The CreateObjectFromByteStream method provides a synchronous way of creating a resolution object for the specified byte stream.
Syntax
    HRESULT CreateObjectFromByteStream(
        [in] IMFByteStream* pByteStream,
        [in] LPCWSTR pwszURL,
        [in] DWORD dwFlags,
        [in] IPropertyStore *pProps,
        [out] MF_OBJECT_TYPE *pObjectType,
        [out] IUnknown **ppObject
        );
Parameters
pByteStream
    [in] Pointer to a byte stream object.
pwszURL
    [in] Optional pointer to the URL that matches the byte stream. If no URL is supplied, then the MF_RESOLUTION_CONTENT_DOES_ NOT_HAVE_TO_ MATCH_EXTENSION resolution flag may be specified so the source resolver will enumerate through the registered byte stream handlers to successfully create a resolution object.

-continued

```
dwFlags
    [in] Specifies resolution flags. See resolution flags section.
pProps
    [in] Holds the optional property store object that gets passed
    to the underlying scheme and byte stream handlers. It can
    also contain source resolver flags under the property key of
    MFPKEY_Resolution_Flags. If a property store it not to be
    used, then this parameter should be set to NULL.
pObjectType
    [out] Specifies type of object that is being returned. Possible
    values are:
        MF_OBJECT_MEDIASOURCE
        MF_OBJECT_BYTESTREAM
        MF_OBJECT_PLAYLIST
        MF_OBJECT_TIMELINE
        MF_OBJECT_INVALID
ppObject
    [out] Holds the resolution object that is being returned.
Return Values
If the method succeeds, it returns S_OK. If it fails, it returns an error
code.
IMFSourceResolver::BeginCreateObjectFromURL
The BeginObjectSourceFromURL method provides an asynchronous
way for creating a resolution object for the specified URL.
Syntax
HRESULT BeginCreateObjectFromURL(
        [in] LPCWSTR pwszURL,
        [in] DWORD dwFlags,
        [in] IPropertyStore *pProps,
        [out] IUnknown * *ppIUnknownCancelCookie
        [in] IMFAsyncCallback *pCallback,
        [in] IUnknown *punkState
        );
Parameters
pwszURL
    [in] Specifies the URL to be resolved.
dwFlags
    [in] Specifies resolution flags. See resolution flags section.
pProps
    [in] Holds the optional property store object that gets passed
    to the underlying scheme and byte stream handlers. It can
    also contain source resolver flags under the property key of
    MFPKEY_Resolution_Flags. If a property store it not to be
    used, then this parameter should be set to NULL.
ppIUnknownCancelCookie
    [out] Holds the cancellation cookie that can be used in a call
    to CancelObjectCreation(...) to abort the resolution process.
    This parameter is optional and can be NULL. It is the
    responsibility of the caller to Release the IUnknown pointer.
pCallback
    [in] Pointer to an async callback object.
punkState
    [in] Pointer to a caller defined context object associated with
    this call.
Return Values
If the method succeeds, it returns S_OK. If it fails, it returns an error
code.
IMFSourceResolver::EndCreateObjectFromURL
The EndCreateObjectFromURL method completes the asynchronous
operation started with the BeginCreateObjectFromURL call and
returns the resolution object if the operation succeeds.
Syntax
HRESULT EndCreateObjectFromURL(
        [in] IMFAsyncResult *pResult,
        [out] MFOBJECT_TYPE *pObjectType,
        [out] IUnknown **ppObject);
Parameters
pResult
    [in] Pointer to an async result object passed in through
    Invoke.
pObject Type
    [out] Specifies type of object that is being returned. Possible
    values are:
        MF_OBJECT_MEDIASOURCE
        MF_OBJECT_BYTESTREAM
        MF_OBJECT_PLAYLIST
        MF_OBJECT_TIMELINE
        MF_OBJECT_INVALID
ppObject
    [out] Holds the resolution object that is being returned.
Return Values
If the method succeeds, it returns S_OK. If it fails, it returns an error
code.
IMFSourceResolver::BeginCreateObjectFromByteStream
The BeginCreateObjectFromByteStream method provides an
asynchronous way for creating a resolution object that for the
specified byte stream.
Syntax
BeginCreateObjectFromByteStream(
        [in] IMFByteStream* pByteStream,
        [in] LPCWSTR pwszURL,
        [in] DWORD dwFlags,
        [in] IPropertyStore *pProps,
        [out] IUnknown * *ppIUnknownCancelCookie
        [in] IMFAsyncCallback *pCallback,
        [in] IUnknown *punkState
        );
Parameters
pByteStream
    [in] Pointer to a byte stream object.
pwszURL
    [in] Optional pointer to the URL that matches the byte
    stream. If no URL is supplied, then the
    MF_RESOLUTION_CONTENT_DOES_NOT_HAVE_
    TO_MATCH_EXTENSION resolution flag will preferably be
    specified so the source resolver will enumerate through the
    registered byte stream handlers to successfully create a
    resolution object.
dwFlags
    [in] Specifies resolution flags. See resolution flags section.
pProps
    [in] Holds the optional property store object that gets passed
    to the underlying scheme and byte stream handlers. It can
    also contain source resolver flags under the property key of
    MFPKEY_Resolution_Flags. If a property store it not to be
    used, then this parameter should be set to NULL.
ppIUnknownCancelCookie
    [out] Holds the cancellation cookie that can be used in a call
    to CancelObjectCreation(...) to abort the resolution process.
    This parameter is optional and can be NULL. It is the
    responsibility of the caller to Release the IUnknown pointer.
pCallback
    [in] Pointer to an async callback object
punkState
    [in] Pointer to a context object associated with this call
Return Values
If the method succeeds, it returns S_OK. If it fails, it returns an error
code.
IMFSourceResolver::EndCreateObjectFromByteStream
The EndCreateObjectFromByte Stream method completes an
asynchronous operation started with the
BeginCreateObjectFromByteStream call and returns the resolution
object if the operation succeeds.
Syntax
HRESULT EndCreateObjectFromByteStream(
        [in] IMFAsyncResult *pResult,
        [out] MF_OBJECT_TYPE *pObjectType,
        [out] IUnknown **ppObject
Parameters
pResult
    [in] Pointer to an async result object passed in through
    Invoke.
pObjectType
    [out] Specifies type of object that is being returned. Possible
    values are:
        MF_OBJECT_MEDIASOURCE
        MF_OBJECT_BYTESTREAM
        MF_OBJECT_PLAYLIST
        MF_OBJECT_TIMELINE
        MF_OBJECT_INVALID
ppObject
    [out] Holds the resolution object that is being returned.
Return Values
If the method succeeds, it returns S_OK. If it fails, it returns an error
code.
IMFSourceResolver::CancelObjectCreation
The CancelObjectCreation method attempts to cancel the requested
```

-continued resolution associated with the provided cancel cookie. The cancel
cookie was obtained from one of the asynchronous
BeginCreateObjectFromXXX calls. Note that canceling an existing
resolution request is deemed to be "best-effort" and might not truly
yield the expected resource relinquishing effect as the resolution
might have already completed and the user callback not invoked yet.
Syntax
    HRESULT CancelObjectCreation(
        [in] IUnknown *pIUnknownCancelCookie
    );
Parameters
pIUnknownCancelCookie
    [in] Pointer to an IUnknown object that was provided by a
    call to either BeginCreateObjectFromURL or
    BeginCreateObjectFromByteStream.
Return Values
If the method succeeds, it returns S_OK. If it fails, it returns an error
code.

As previously noted, in accordance with one implementation, in addition to the IUnkown interface, the object selection module 214 implements one API, a source resolver interface ("IMFSourceResolver") 280 and is capable of using a caller supplied resolution callback interface ("IMFResolutionCallback") 282. IN accordance with one implementation, the object selection module 214 allows a resolution callback to be specified in the property store of the BeginCreationObjectFromURL and BeginCreateObjectFromByteStream methods. If an IMFResolutionCallback object is provided under the MFPKEY_Resolution_Callback property key as an IUnknown, the MF Source Resolver will use the caller supplied callback interface during resolution to allow the caller to assist in resolution. This is convenient when an application has its own scheme and/or bytestream handler that is wishes to use, but it does not want to register it with Media Foundation so that other applications cannot use it.

The IMFResolutionCallback interface 282 exposes three methods, which are defined as follows:

IMFResolutionCallback::HandleResolution
The HandleResolution method is called by the object selection
module 214 before resolution begins to give the caller a chance to
specify the byte stream handler that should be tried first.
Syntax
    HRESULT HandleResolution(
        [in] LPCWSTR pwszURL,
        [in] IMFByteStream * pByteStream,
        [out] IMFByteStreamHandler ** ppIMFByteStreamHandler
    );
Parameters
pwszURL
    [in] The URL that is being asked to resolve.
    pByteStream
    [in] Pointer to a byte stream object.
ppIMFByteStreamHandler
    [out] Pointer to a byte stream object that the Source Resolver
    should use first in the resolution process.
Return Values
If the method succeeds, it returns S_OK. If it fails, it returns an error
code.
IMFResolutionCallback::HandleNoMatchingSchemeResolverFound
The HandleNoMatchingSchemeResolverFound method is called by
the object selection module 214 if no appropriate scheme handler is
found during the resolution process.
Syntax
    HRESULT HandleNoMatchingSchemeResolverFound(
        [in] LPCWSTR pwszURL,
        [out] BOOL* pfContinueResolutionProcess
    );

-continued

Parameters
pwszURL
    [in] The URL that is being resolved.
pfContinueResolutionProcess
    [in] Pointer to a flag that the indicates whether to continue
    with resolution.
Return Values
If the method succeeds, it returns S_OK. If it fails, it returns an error
code.
IMFResolutionCallback::HandleNoMatchingExtensionAndDataFound
The HandleNoMatchingExtensionAndDataFound method is called
by the object selection module 214 if no appropriate scheme
handler is found during the resolution process.
Syntax
    HRESULT HandleNoMatchingSchemeResolverFound(
        [in] LPCWSTR pwszURL,
        [out] BOOL* pfContinueResolutionProcess
    );
Parameters
pwszURL
    [in] The URL that is being resolved.
pByteStream
    [in] Pointer to a byte stream object.
pfContinueResolutionProcess
    [in] Pointer to a flag that the indicates whether to continue
    with resolution by enumerating through the byte stream
    handlers.
Return Values
If the method succeeds, it returns S_OK. If it fails, it returns an error
code.

As previously noted, the scheme handler 217 has the responsibility to connect and communicate with a resource for the scheme (i.e., a protocol) it is registered to handle. Upon completion of the process, the scheme handler 217 will either return a media source that can handle the underlying data, return a byte stream object, return a timeline object, or fail with an error. In accordance with one implementation, these tasks are facilitated using, in addition to the IUnknown interface, an IMFSchemeHandler interface 286. The IMFSchemeHandler interface 286 exposes three methods, which are defined as follows:

IMFSchemeHandler::BeginCreateObject
The BeginCreateObject method provides an asynchronous way for
creating an object that can connect and read data from the resource
pointed to by the specified URL.
Syntax
    HRESULT BeginCreateObject(
        [in] LPCWSTR pwszURL,
        [in] DWORD dwFlags,
        [in] IPropertyStore *pProps,
        [out] IUnknown **ppIUnknownCancelCookie
        [in] IMFAsyncCallback *pCallback,
        [in] IUnknown *punkState
Parameters
pwszURL
    [in] Pointer to URL to be resolved.
dwFlags
    [in] Specifies resolution flags. See resolution flags section.
pProps
    [in] Holds the optional property store object that can contain
    other scheme resolution related objects and flags. If a
    property store it not to be used, then this arg should be set to
    NULL.
ppIUnknownCancelCookie
    [out] Holds the cancellation cookie that can be used in a call
    to CancelObjectCreation(...) to abort the resolution process.
    This parameter is optional and can be NULL. It is the
    responsibility of the caller to Release the IUnknown pointer.
pCallback
    [in] Pointer to an async callback object -continued

```
punkState
    [in] Pointer to a context object associated with this call
Return Values
If the method succeeds, it returns S_OK. If it fails, it returns an error
code.
IMFSchemeHandler::EndCreateObject
The EndCreateObject method completes the asynchronous call
started in BeginCreateObject and returns the appropriate object that
can connect and read data from the specified URL. Upon successful
completion of this call, the caller can verify the value of
pObjectType and query for the corresponding interface through
QueryInterface.
Syntax
    HRESULT EndCreateObject (
        [in] IMFAsyncResult* pResult,
        [out] MF_OBJECT_TYPE* pObjectType,
        [out] IUnknown** ppunkObject
    );
Parameters
pResult
    [in] Pointer to an async result object passed in through
Invoke.
pObjectType
    [out] Specifies type of object that is being returned. Possible
    values are:
        MF_OBJECT_MEDIASOURCE
        MF_OBJECT_BYTESTREAM
        MF_OBJECT_PLAYLIST
        MF_OBJECT_TIMELINE
        MF_OBJECT_INVALID
ppObject
    [out] Holds the resolution object that is being returned.
Return Values
If the method succeeds, it returns S_OK. If it fails, it returns an error
code.
IMFSchemeHandler::CancelObjectCreation
The CancelObjectCreation method attempts to cancel the requested
resolution associated with the provided cancel cookie. The cancel
cookie was obtained from the asynchronous BeginCreateObject call.
Note that canceling an existing resolution request is deemed to be
"best-effort" and might not truly yield the expected resource
relinquishing effect as the resolution might have already completed
and the user callback not invoked yet.
Syntax
    HRESULT CancelObjectCreation(
        [in] IUnknown *pIUnknownCancelCookie
    );
Parameters
pIUnknownCancelCookie
    [in] Pointer to an IUnknown object that was provided by the
    call BeginCreateObject.
Return Values
If the method succeeds, it returns S_OK. If it fails, it returns an error
code.
```

As previously noted, the byte stream handler 284 object has the responsibility to identify the format of data presented to it in the form of a byte stream and return an appropriate media source. Upon completion of the process, a Byte Stream handler will either return a media source or fail with an error. In accordance with one implementation, these tasks are facilitated using, in addition to the IUnknown interface, a IMFByteStreamHandler interface 284. The IMFByteStreamHandler interface 284 exposes five methods, which are defined as follows:

```
IMFByteStreamHandler::BeginCreateObject
The BeginCreateObject method provides an asynchronous way for
creating a resolution object from the supplied the byte stream.
Syntax
    HRESULT BeginCreateObject(
        [in] IMFByteStream *pByteStream,
        [in] LPCWSTR pwszURL,
        [in] DWORD dwFlags,
        [in] IPropertyStore *pProps,
        [out] IUnknown * *ppIUnknownCancelCookie
        [in] IMFAsyncCallback *pCallback,
        [in] IUnknown *punkState
    );
Parameters
pByteStream
    [in] Pointer to a byte stream object.
pwszURL
    [in] Optional pointer to the URL that matches the byte
    stream.
dwFlags
    [in] Specifies resolution flags. See resolution flags section.
pProps
    [in] Holds the optional property store object that can contain
    other byte stream resolution related objects and flags. If a
    property store it not to be used, then this arg should be set to
    NULL.
ppIUnknownCancelCookie
    [out] Holds the cancellation cookie that can be used in a call
    to CancelObjectCreation(...) to abort the resolution process.
    This parameter is optional and can be NULL. It is the
    responsibility of the caller to Release the IUnknown pointer.
pCallback
    [in] Pointer to an async callback object
punkState
    [in] Pointer to a context object associated with this call
Return Values
If the method succeeds, it returns S_OK. If it fails, it returns an error
code.
IMFByteStreamHandler::EndCreateObject
The EndCreateObject method completes the asynchronous call
started in BeginCreateObject and returns the resolution object
obtained from the supplied bytestream.
Syntax
    HRESULT EndCreateObject(
        [in] IMFAsyncResult *pResult,
        [out] MF OBJECT_TYPE *pObjectType,
        [out] IUnknown **ppObject
    );
Parameters
pResult
    [in] Pointer to an async result object passed in through
    Invoke.
pObjectType
    [out] Specifies type of object that is being returned. Possible
    values are:
        MF_OBJECT_MEDIASOURCE
        MF_OBJECT_BYTESTREAM
        MF_OBJECT_PLAYLIST
        MF_OBJECT_TIMELINE
        MF_OBJECT_INVALID
ppObject
    [out] Holds the resolution object that is being returned.
Return Values
If the method succeeds, it returns S_OK. If it fails, it returns an error
code.
IMFByteStreamHandler::CancelObjectCreation
The CancelObjectCreation method attempts to cancel the requested
resolution associated with the provided cancel cookie. The cancel
cookie was obtained from the asynchronous BeginCreateObject call.
Note that canceling an existing resolution request is deemed to be
"best-effort" and might not truly yield the expected resource
relinquishing effect as the resolution might have already completed
and the user callback not invoked yet.
Syntax
    HRESULT CancelObjectCreation(
        [in] IUnknown *pIUnknownCancelCookie
    );
Parameters
pIUnknownCancelCookie
    [in] Pointer to an IUnknown object that was provided by the
    call BeginCreateObject.
Return Values
If the method succeeds, it returns S_OK. If it fails, it returns an error
code.
IMFByteStreamHandler::GetMaxNumberOfBytesRequiredForResolution
The GetMextNumberOfBytesRequiredForResolution method should
```

-continued return the maximum number of bytes the byte stream handler
requires to either create a resolution object or to signify that it cannot
handle the byte stream.
Syntax
    HRESULT GetMaxNumberOfBytesRequiredForResolution(
        [out] QWORD *pqwBytes
        );
Parameters
pqwBytes
    [out] The number of bytes required for resolution
Return Values
If the method succeeds, it returns S_OK. If it fails, it returns an error code.

The following four tables briefly describe the resolution flags that can be used in the BeginCreateObjectXXX calls described above:

TABLE 1

Resolution Object Requested

| Flag | Description |
| --- | --- |
| MF_RESOLUTION_MEDIASOURCE | The resolution process should attempt to return a Media Source object |
| MF_RESOLUTION_BYTESTREAM | The resolution process should attempt to return a Byte Stream object |
| MF_RESOLUTION_PLAYLIST | The resolution process should attempt to return a "play list" object |
| MF_RESOLUTION_TIMELINE | The resolution process should attempt to return a timeline object |

TABLE 2

Resolution Behavior

| Flag | Description |
| --- | --- |
| MF_RESOLUTION_CONTENT_DOES_NOT_HAVE_TO_MATCH_EXTENSION | Enumerates though all byte stream handlers, if the default byte stream handler for the extension fails. For example, suppose we have a WMV file with the extension ".MP3". If you do not specify this flag, then the resolver will only try to invoke the MP3 handler on the file and it will fail since it is not an mp3 file. If this flag is specified, then after the failure, it will enumerate through all it's known handlers to see if any of them will accept the file NOTE: This flag is mutually exclusive with the MF_RESOLUTION_KEEP_BYTE_STREAM_ALIVE_ON_FAIL flag |
| MF_RESOLUTION_KEEP_BYTE_STREAM_ALIVE_ON_FAIL | This flag allows the bytestream that the resolver creates during resolution to be cached (kept alive) on failure so it can be used on the subsequent call. By specifying this flag, the caller agrees to attempt resolution again if the resolution fails. For example, suppose we are trying to play back a network URL that points to a file with extension ".MP3" and resolution fails because the file is really a misnamed WMV file. If this flag is specified for the first resolution, then the network byte stream is cached (kept alive) by the resolver. On the subsequent resolution, the user would specify the MF_RESOLUTION_CONTENT_DOES_NOT_HAVE_TO_MATCH_EXTENSION flag to allow handler enumeration. By using the MF_RESOLUTION_KEEP_BYTE_STREAM_ALIVE_ON_FAIL, the networked URL is accessed once even though resolution is done twice. In this manner, the web server logs depict a more accurate access count. NOTE: This flag is mutually exclusive with the MF_RESOLUTION_CONTENT_DOES_NOT_HAVE_TO_MATCH_EXTENSION flag |

TABLE 3

Functionality Behavior

| Flag | Description |
| --- | --- |
| MF_RESOLUTION_METADATA | Used to tell the created MediaSource object that meta data will probably be accessed. |
| MF_RESOLUTION_AUDIO_VIDEO | Used to tell the created MediaSource object that audio and video data will probably be accessed |
| MF_RESOLUTION_NAVIGATION_DATA | Used to tell the created MediaSource object that navigation data will probably be accessed |

TABLE 4

Access Mode Requested

| Flag | Description |
| --- | --- |
| MF_RESOLUTION_READ | The requested resource should be opened in read mode. |
| MF_RESOLUTION_WRITE | The requested resource should be opened in write mode. |
| MF_RESOLUTION_CREATE | The requested resource should be opened in create mode. |

As previously noted, in accordance with one implementation, the object selection module 214 uses function discovery to find scheme and byte stream handlers. In one implementation, function discovery only creates true COM objects. Hence, in this implementation, all scheme and byte stream handlers will be truly CoCreate-able.

The following sample code illustrates how to register scheme handlers using function discovery:

```
static HRESULT
RegisterYOYOSchemeHandlerWithFunctionDiscovery( )
{
    GUID YOYO_SCHEME_HANDLER_COM_CLASSID = {0};
    HRESULT hr = S_OK;
    PROPVARIANT propvarString;
    PropVariantInit( &propvarString );
    do
    {
        //
        // Create the Function Discovery Object
        //
        ComSmartPtr<IFunctionDiscovery> spIFunctionDiscovery;
        hr = ::CoCreateInstance(
            __uuidof(FunctionDiscovery),
                        NULL,
                        CLSCTX_ALL,
                        __uuidof( IFunctionDiscovery ) ,
                        (void**) &spIFunctionDiscovery );
        CHECKHR_BRK( hr );
        //
        // Create the function instance builder
        //
        ComSmartPtr<IFunctionInstanceBuilder> spIFunctionInstanceBuilder;
        hr = spIFunctionDiscovery->TEMP_RegisterFunctionInstance(
            FUNCTION_DISCOVERY_CATEGORY_MF_RESOLUTION_SCHEME_HANDLERS,
                        L"YOYO: Scheme Handler Function Instance",
                        IVF_DEFAULT,
            &spIFunctionInstanceBuilder );
        CHECKHR_BRK ( hr );
        //
        // Tell FD we only support IMFSchemeHandler interface and
        // the COM class ID to create
        //
        hr = spIFunctionInstanceBuilder->SetInterface( &IID_IMFSchemeHandler,
                NULL,
            &YOYO_SCHEME_HANDLER_COM_CLASSID, NULL );
        CHECKHR_BRK( hr );
        //
        // Get the Function Instance property store
        //
        ComSmartPtr< IInternalPropertyStore >
```

-continued

```
spIInternalPropertyStore;
        hr = spIFunctionInstanceBuilder-
>GetInternalPropertyStore(
            &spIInternalPropertyStore );
        CHECKHR_BRK( hr );
        //
        // Store the supported scheme
        //
        propvarString.vt = VT_LPWSTR;
        propvarString.pwszVal = L"yoyo:";
        hr = spIInternalPropertyStore->SetValue(
MFPKEY_Resolution_FunctionDiscovery_Scheme,
            &propvarString );
        CHECKHR_BRK( hr );
        //
        // Store the "name"
        //
        propvarString.vt = VT_LPWSTR;
        propvarString.pwszVal = L"YOYO: Scheme
Handler for MF";
        hr = spIInternalPropertyStore->SetValue(
PKEY_NAME, &propvarString );
        CHECKHR_BRK ( hr );
        //
        // Store a little comment
        //
        propvarString.vt = VT_LPWSTR;
        propvarString.pwszVal = L"This is the
YOYO: scheme handler for MF!!!!!";
        hr = spIInternalPropertyStore->SetValue(
PKEY_Comment , &propvarString );
        CHECKHR_BRK( hr );
        //
        // Commit the changes to Function
Discovery
        //
        hr = spIFunctionInstanceBuilder-
>TEMP_CommitChanges( );
        CHECKHR_BRK( hr );
    }
    while( FALSE );
    DestroyPropVariant( &propvarString );
    return ( hr );
}
```

40

The following is sample code that demonstrates ho to register a byte stream handler:

```
HRESULT RegisterXYZByteStreamHandlerWithFD( )
{
    HRESULT hr = S_OK;
    PROPVARIANT propvarFDPropStoreEntry;
    PropVariantInit( &propvarFDPropStoreEntry );
    do
    {
        //
        // Create the Function Discovery Object
        //
        ComSmartPtr<IFunctionDiscovery>
spIFunctionDiscovery;
        hr = ::CoCreateInstance( __uuidof(
FunctionDiscovery ),
                NULL,
                CLSCTX_ALL,
                __uuidof(
IFunctionDiscovery ),
(void**)&spIFunctionDiscovery );
        CHECKHR_BRK( hr );
        //
        // Create the name of the bytestream
hander and its function instance
        //
        CMFStringW sByteStreamHandlerName( L" .xyz
```

-continued

```
Byte Stream Handler" );
        CMFStringW
sByteStreamHandlerFunctionInstanceName( L" .xyz
Byte Stream Handler Function Instance" );
        //
        // Create the function instance builder
        //
        ComSmartPtr<IFunctionInstanceBuilder>
spIFunctionInstanceBuilder;
        hr = spIFunctionDiscovery-
>TEMP_RegisterFunctionInstance(
FUNCTION_DISCOVERY_CATEGORY_MF_RESOLUTION_BYTESTR
EAM_HANDLERS,
sByteStreamHandlerFunctionInstanceName.PContents(
),
        IVF_DEFAULT,
        &spIFunctionInstanceBuilder );
        CHECKHR_BRK( hr );
        //
        // Tell FD we only support
IMFByteStreamHandler interface and
        // the COM class ID to create
        //
        hr = spIFunctionInstanceBuilder-
>SetInterface( &IID_IMFByteStreamHandler,
NULL,
&XYZ_BYTE_STREAM_HANDLER_COM_CLASSID, NULL );
        CHECKHR_BRK( hr );
        //
        // Get the Function Instance property
store
        //
        ComSmartPtr< IInternalPropertyStore >
spIInternalPropertyStore;
        hr = spIFunctionInstanceBuilder-
>GetInternalPropertyStore(
&spIInternalPropertyStore );
        CHECKHR_BRK( hr );
        //
        // Store the supported file extension for
this byte stream handler
        //
        propvarFDPropStoreEntry.vt = VT_LPWSTR;
        propvarFDPropStoreEntry.pwszVal =
L" .xyz";
        hr = spIInternalPropertyStore->SetValue(
MFPKEY_Resolution_FunctionDiscovery_FileExtension
,
&propvarFDPropStoreEntry );
        CHECKHR_BRK( hr );
        //
        // Store the "name"
        //
        propvarFDPropStoreEntry.vt = VT_LPWSTR;
        propvarFDPropStoreEntry.pwszVal = (WCHAR
*) sByteStreamHandlerName.PContents( );
        hr = spIInternalPropertyStore->SetValue(
PKEY_NAME, &propvarFDPropStoreEntry );
        CHECKHR_BRK( hr );
        //
        // Store the max number of bytes required
for resolution
        //
        ComSmartPtr<IMFByteStreamHandler>
spIMFByteStreamHandler;
        hr = CreateXYZByteStreamHandler(
&spIMFByteStreamHandler );
        CHECKHR_BRK( hr );
        QWORD qwMaxNumberOfBytes = −1;
        hr = spIMFByteStreamHandler-
>GetMaxNumberOfBytesRequiredForResolution(
&qwMaxNumberOfBytes );
        CHECKHR_BRK( hr );
        propvarFDPropStoreEntry.vt = VT_UI8;
        propvarFDPropStoreEntry.uhVal.QuadPart =
qwMaxNumberOfBytes;
        hr = spIInternalPropertyStore->SetValue(
```

```
MFPKEY_Resolution_FunctionDiscovery_MaxNumberOfBy
tesRequiredForResolution,
        &propvarFDPropStoreEntry );
    CHECKHR_BRK( hr );
    //
    // Store a little comment
    //
    propvarFDPropStoreEntry.vt = VT_LPWSTR;
    propvarFDPropStoreEntry.pwszVal = L"This
is .xyz Byte Stream Handler that I wrote while I
was watching Justice League.";
        hr = spIInternalPropertyStore->SetValue(
PKEY_Comment,
&propvarFDPropStoreEntry );
    CHECKHR_BRK( hr );
    //
    // Commit the new Function Instance to
Function Discovery
    //
    hr = spIFunctionInstanceBuilder-
>TEMP_CommitChanges( );
    CHECKHR_BRK( hr );
    }
    while( FALSE );
    DestroyPropVariant( &propvarFDPropStoreEntry
);
    return( hr );
    }
```

FIG. 4 illustrates one operating environment 410 in which the various systems, methods, and data structures described herein may be implemented. The exemplary operating environment 410 of FIG. 4 includes a general purpose computing device in the form of a computer 420, including a processing unit 421, a system memory 422, and a system bus 423 that operatively couples various system components include the system memory to the processing unit 421. There may be only one or there may be more than one processing unit 421, such that the processor of computer 420 comprises a single central-processing unit (CPU), or a plurality of processing units, commonly referred to as a parallel processing environment. The computer 420 may be a conventional computer, a distributed computer, or any other type of computer.

The system bus 423 may be any of several types of bus structures including a memory bus or memory controller, a peripheral bus, and a local bus using any of a variety of bus architectures. The system memory may also be referred to as simply the memory, and includes read only memory (ROM) 424 and random access memory (RAM) 425. A basic input/output system (BIOS) 426, containing the basic routines that help to transfer information between elements within the computer 420, such as during start-up, is stored in ROM 424. The computer 420 further includes a hard disk drive 427 for reading from and writing to a hard disk, not shown, a magnetic disk drive 428 for reading from or writing to a removable magnetic disk 429, and an optical disk drive 430 for reading from or writing to a removable optical disk 431 such as a CD ROM or other optical media.

The hard disk drive 427, magnetic disk drive 428, and optical disk drive 430 are connected to the system bus 423 by a hard disk drive interface 432, a magnetic disk drive interface 433, and an optical disk drive interface 434, respectively. The drives and their associated computer-readable media provide nonvolatile storage of computer-readable instructions, data structures, program modules and other data for the computer 420. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 429, optical disk 431, ROM 424, or RAM 425, including an operating system 435, one or more application programs 436, other program modules 437, and program data 438. A user may enter commands and information into the personal computer 420 through input devices such as a keyboard 40 and pointing device 442. Other input devices (not shown) may include a microphone, joystick, game pad, satellite dish, scanner, or the like. These and other input devices are often connected to the processing unit 421 through a serial port interface 446 that is coupled to the system bus, but may be connected by other interfaces, such as a parallel port, game port, or a universal serial bus (USB). A monitor 447 or other type of display device is also connected to the system bus 423 via an interface, such as a video adapter 448. In addition to the monitor, computers typically include other peripheral output devices (not shown), such as speakers and printers.

The computer 420 may operate in a networked environment using logical connections to one or more remote computers, such as remote computer 449. These logical connections may be achieved by a communication device coupled to or a part of the computer 420, or in other manners. The remote computer 449 may be another computer, a server, a router, a network PC, a client, a peer device or other common network node, and typically includes many or all of the elements described above relative to the computer 420, although only a memory storage device 450 has been illustrated in FIG. 4. The logical connections depicted in FIG. 4 include a local-area network (LAN) 451 and a wide-area network (WAN) 452. Such networking environments are commonplace in office networks, enterprise-wide computer networks, intranets and the Internal, which are all types of networks.

When used in a LAN-networking environment, the computer 420 is connected to the local network 451 through a network interface or adapter 453, which is one type of communications device. When used in a WAN-networking environment, the computer 420 typically includes a modem 454, a type of communications device, or any other type of communications device for establishing communications over the wide area network 452. The modem 454, which may be internal or external, is connected to the system bus 423 via the serial port interface 446. In a networked environment, program modules depicted relative to the personal computer 420, or portions thereof, may be stored in the remote memory storage device. It is appreciated that the network connections shown are exemplary and other means of and communications devices for establishing a communications link between the computers may be used.

Although some exemplary methods and systems have been illustrated in the accompanying drawings and described in the foregoing Detailed Description, it will be understood that the methods and systems shown and described are not limited to the particular implementation described herein, but rather are capable of numerous rearrangements, modifications and substitutions without departing from the spirit set forth and defined by the following claims.

The invention claimed is:

1. A method implemented in a component object-based multimedia framework of an operating system executing on a computing device, the method comprising:
   receiving a uniform resource locator (URL) as associated with one of a plurality of applications requesting media content;
   identifying a scheme associated with the URL;
   selecting a first object operated to handle the identified scheme associated with the URL to access parameter data from a location specified by the URL;
   invoking the first object and determining whether the first object produces a second object according to a requested media content type;
   in an event the second object is produced according to the requested media content type, then returning the second object to the one of the plurality of applications;
   in an event the second object comprises a media source object, then returning the media source object to the one of the plurality of applications via a component object-based pipeline, the pipeline comprising:
      the media source object performing format-specific parsing to produce one or more streams of data that are sent through the pipeline, and
      one or more media sinks rendering or archiving the media content; and
   in an event the second object comprises a byte stream object and the requested media content type is a media source object or a timeline object, then invoking one or more selected byte stream handlers to generate the requested media source object, wherein the byte stream handler is selected based in part on the byte stream object, and returning the requested media source object to the one of the plurality of applications via the component object-based pipeline.

2. The method as recited in claim 1, wherein the selection of the second object is additionally based on information contained in the URL indicating a type of multimedia data of the media content.

3. The method as recited in claim 1, wherein the selection of the second object is additionally based on Multipurpose Internet Mail Extensions MIME data.

4. The method as recited in claim 1, wherein the first object is produced using a scheme handler.

5. The method as recited in claim 1, wherein the second object is produced using a byte stream handler.

6. The method as recited in claim 1, wherein the first object is produced by a scheme handler and the second object is produced by a byte stream handler.

7. The method as recited in claim 1, wherein the first object is produced using a scheme handler selected from a list of two or more scheme handlers.

8. The method as recited in claim 1, wherein the second object is produced using a byte stream handler selected from a list of two or more byte stream handlers.

9. The method as recited in claim 1, wherein the first object is produced using a scheme handler selected from a list of two or more scheme handlers and the second object is produced using a byte stream handler selected from a list of two or more byte stream handlers.

10. The method as recited in claim 1, wherein the second object is produced using a byte stream handler selected from a list of byte stream handlers and wherein each byte stream handler in the list has a selection value associated therewith.

11. The method as recited in claim 1, wherein the second object is produced using a byte stream handler selected from a list of byte stream handlers and wherein each byte stream handler in the list has a cost value associated therewith.

12. The method as recited in claim 1, wherein the second object is produced using a byte stream handler selected from a list of byte stream handlers and wherein each byte stream handler in the list has a cost value associated therewith, the cost value indicating how many bytes must be read by the byte stream handler in determining if the byte stream handler is appropriate for selecting the second object.

13. A computer-readable medium having computer-executable instructions for performing operations in a component object-based multimedia framework encoded thereon, the computer-executable instructions, upon execution configuring a processing unit to perform the operations comprising:
   receiving a uniform resource locator (URL) specifying a location of media content as associated with one of a plurality of applications requesting media content;
   determining a scheme of the URL;
   using the scheme to produce a byte stream object to handle the determined scheme associated with the URL to access parameter data;
   using the byte stream object to generate a byte stream from the media content; and
   using at least a portion of the byte stream to produce a media source object such that the media source object:
   performs format-specific parsing to produce one or more streams of data that are sent through the pipeline, and one or more media sinks render or archive the media content;
   based on the accessed parameter data, reads the media content of a given type from the location specified by the URL, and generates one or more streams of media data in a component object-based pipeline of the multimedia framework, the pipeline further comprising one or more media sinks rendering or archiving the media content.

14. The computer-readable medium as recited in claim 13, wherein the operation of using the byte stream additionally includes using a file extension indicated in the URL to select the source object.

15. The computer-readable medium as recited in claim 13, wherein the operation of producing a byte stream object includes choosing a scheme handler and using the chosen scheme handler to produce the byte stream object.

16. The computer-readable medium as recited in claim 13, wherein the operation of producing a byte stream object includes choosing a scheme handler from a list of scheme handlers and using the chosen scheme handler to produce the byte stream object.

17. The computer-readable medium as recited in claim 13, wherein the operation of producing a media source object includes choosing a byte stream handler and using the chosen byte stream handler to produce the media source object.

18. The computer-readable medium as recited in claim 13, wherein the operation of producing a media source object includes choosing a byte stream handler from a list of byte stream handlers and using the chosen byte stream handler to produce the media source object.

19. The computer-readable medium as recited in claim 13, wherein the operation of producing a media source object includes choosing a byte stream handler from a list of byte stream handlers and using the chosen byte stream handler to produce the media source object and wherein the list of byte stream handlers is ordered based on a selection values associated with the byte stream handlers.

20. The computer-readable medium as recited in claim 13, wherein the operation of producing a source object includes choosing a byte stream handler from a list of byte stream handlers and using the chosen byte stream handler to produce the media source object and wherein the list of byte stream handlers is ordered based on a cost values associated with the byte stream handlers.

21. The computer-readable medium as recited in claim 13, wherein the operation of producing a media source object includes choosing a byte stream handler from a list of byte stream handlers and using the chosen byte stream handler to produce the media source object and wherein and each byte stream handler in the list has a cost value associated therewith, the cost value indicating an amount of data that must be read by the byte stream handler in determining if the byte stream handler is appropriate for producing the media source object.

22. The computer-readable medium as recited in claim 13, wherein the operation of producing a media source object includes using a look-up process to select a subset of byte stream handlers from a set of byte stream handlers and using one of the subset of byte stream handlers to produce the media source object.

23. The computer-readable medium as recited in claim 13, wherein the operation of producing a source object includes using a look-up process to:
  select a number of byte stream handlers; and
  invoke the selected byte stream handlers one at a time until a byte stream handler produces a media source object.

24. The computer-readable medium as recited in claim 13, wherein the operation of producing a media source object includes using a look-up process to:
  select a number of byte stream handlers; and
  invoke the selected byte stream handlers one at a time in a predetermined order until a byte stream handler produces a media source object.

25. The computer-readable medium as recited in claim 13, wherein the operation of producing a media source object includes using a look-up process to:
  select a number of byte stream handlers; and
  invoke the byte stream handlers one at a time in a predetermined order based on cost values associated with the selected byte stream handlers until a byte stream handler produces a media source object.

26. The computer-readable medium as recited in claim 13, wherein the operation of producing a media source object includes using a look-up process to:
  select a number of byte stream handlers;
  compile a first list of byte stream handlers, each of the byte stream handlers in the first list being associated with the type of the media content;
  compile a second list of byte stream handlers, each of the byte stream handlers in the second list not being associated with the type of the media content;
  invoke the byte stream handlers in the first list one at a time until either a byte stream handler in the first list produces a media source object or until all byte stream handlers in the first list have been invoked without producing a media source object; and
  in an event all byte stream handlers in the first list have been invoked and none of the invoked byte stream handler from the first list produced a media source object, then invoking each of the byte stream handlers in the second list one at a time until either a either a byte stream handler from the second list produces a source object or until all byte stream handlers in the second list have invoked without producing a media source object.

27. The computer-readable medium as recited in claim 13, wherein the operation of producing a media source object includes using a look-up process to:
  select a number of byte stream handlers;
  compile a first list of byte stream handlers, each of the byte stream handlers in the first list being associated with the type of the media content, the byte stream handlers in the first list being ordered according to cost values associated with the byte stream handlers in the first list;
  compile a second list of byte stream handlers, each of the byte stream handlers in the second list not being associated with the type of the media content;
  invoke the byte stream handlers in the first list one at a time in order until either a byte stream handler in the first list produces a media source object or until all byte stream handlers in the first list have been invoked without producing a media source object; and
  in an event all byte stream handlers in the first list have been invoked and none of the invoked byte stream handler from the first list produced a source object, then invoking each of the byte stream handlers in the second list one at a time until either a either a byte stream handler from the second list produces a media source object or until all byte stream handlers in the second list have invoked without producing a media source object.

28. The computer-readable medium as recited in claim 13, wherein the operation of producing a byte stream object includes using a look-up process to:
  select a number of scheme handlers; and
  invoke the scheme handlers in the list one at a time until a scheme handler produces a byte stream object.

29. The computer-readable medium as recited in claim 13, wherein the operation of producing a byte stream object includes using a look-up process to:
  select a number of scheme handlers; and
  invoke the scheme handlers in the list one at a time in a predetermined order until a scheme handler produces a byte stream object.

30. The computer-readable medium as recited in claim 13, wherein the operation of producing a media source object includes using a look-up process to:
  select a number of scheme handlers;
  compile a list of scheme handlers, each of the scheme handlers in the list of scheme handlers being associated with the scheme of the URL;
  invoke the scheme handlers in the list of scheme handlers one at a time until either a byte stream object is produced, a media source object is produced, or all scheme handlers in the list of scheme handlers have been invoked and neither a byte stream object nor a media source object have been produced; in an event either a media source object or a byte stream object has been produced, then determining if an application has requested a media source object;

in an event an application has requested a media source object, then providing the media source object to the application; and in an event if the application has not requested a media source object, then compile a list of byte stream handlers and invoking the byte stream handlers in the first list one at a time until either a byte stream handler in the list produces a media source object or until all byte stream handlers in the first list have been invoked without producing a media source object.

31. A computerized system including:

an object selection module in a component object-based multimedia framework operable to:

receive a uniform resource locator (URL) as associated with one of a plurality of applications requesting media content;

determine a scheme of the URL specifying a location of media content;

use the scheme to produce a byte stream object to handle the determined scheme associated with the URL to access parameter data;

use the byte stream object to generate a byte stream from the media content; and use a portion of the byte stream to produce a media source object that, based on the accessed parameter data, reads the media content of a given type from the location specified by the URL, and generates one or more streams of media data in a component object-based pipeline of the multimedia framework, the pipeline further comprising one or more media sinks rendering or archiving the media content.

32. The computerized system as recited in claim 31, wherein the byte stream object is produced using a scheme handler.

33. The computerized system as recited in claim 31, wherein the media source object is produced using a byte stream handler.

34. The computerized system as recited in claim 31, wherein the byte stream object is produced using a scheme handler that is selected from a list of scheme handlers, the list being selected based on the scheme of the URL.

35. The computerized system as recited in claim 31, wherein the media source object is produced using a byte stream handler that is selected from a list of byte stream handlers, the list being selected based on a byte stream generated from data at the location indicated by the URL and a portion of the URL.

36. The computerized system as recited in claim 31, wherein the byte stream object is produced using a scheme handler that is selected from a list of scheme handlers, the list being selected based on the scheme of the URL and ordered based on cost values associated with each of the scheme handlers in the list.

37. The computerized system as recited in claim 31, wherein the operation of producing a media source object includes using a look-up process to:

select a number of byte stream handlers; and invoke the selected byte stream handlers one at a time until a byte stream handler produces a media source object.

38. The computerized system as recited in claim 31, wherein the operation of producing a byte stream object includes using a look-up process to:

select a number of scheme handlers; and invoke the scheme handlers in the list one at a time until a scheme handler produces a byte stream object.

39. A system of a component object-based multimedia framework comprising:

means for receiving a uniform resource locator (URL) as associated with one of a plurality of applications requesting media content;

means for identifying a scheme associated with the URL;

means for selecting a scheme handler based on the identified scheme, the scheme handler producing a byte stream object operable to handle the identified scheme associated with the URL to access parameter data from the location pointed to by the URL and produce a byte stream from the accessed parameter data; and means for selecting a byte stream handler based on the accessed parameter data, the byte stream handler producing a media source object operable to read the media content of a given type, from the location specified by the URL, and operated to generate data in a component object-based pipeline, the pipeline further comprising one or more media sinks rendering or archiving the media content.

40. The system as defined in claim 39, further comprising a lookup means for producing a list of scheme handlers, wherein the means for selecting the scheme handler selects the scheme handler from the list of scheme handlers.

41. The system as defined in claim 39, further comprising a lookup means for producing a list of byte stream handlers, wherein the means for selecting the byte stream handler selects the byte stream handler from the list of byte stream handlers.

42. The system as defined in claim 39, wherein the means for selecting a scheme handler selects the scheme handler in response to a request from an application.

43. The system as defined in claim 39, wherein the means for selecting a byte stream handler selects the byte stream handler in response to a request from an application.

44. The system as defined in claim 39, wherein the media source object produced by the byte stream handler is employed as a component in a multi-component media processing pipeline.

45. The system as defined in claim 39, wherein the media source object produced by the byte stream handler is employed as a component in a multi-component media processing pipeline in a media engine.

46. The system as defined in claim 39, wherein the means for selecting a scheme handler selects the scheme handler in response to a request from an application and wherein the media source object produced by the byte stream handler is employed as a component in a multi-component media processing pipeline in a media processing module that is an operational module in a operating system.

47. The system as defined in claim 39, wherein the means for selecting a byte stream handler employs a lookup module.

48. One or more computer-readable storage media having computer-executable instructions encoded thereon, the computer-executable instructions, upon execution configuring a processing unit to perform operations comprising:

responsive to receiving a uniform resource locator (URL) for media content from one of a plurality of applications executing on an operating system of a computing device, selecting a media source object using an object-based multimedia framework of the operating system, wherein the selecting comprises identifying a scheme associated with the URL;

identifying one or more available scheme handler objects operable to read information associated with the scheme of the URL;

invoking the scheme handler object operable to handle the identified scheme associated with the URL to access parameter data from a location specified by the URL, based on the accessed parameter data, generating a selected media source object; and providing the selected media source object to the one of the plurality of applications executing on the operating system of the computing device via an object-based media pipeline that comprises the media source object that performs format specific parsing to produce one or more streams of media data and providing the one or more streams of media data to a media sink object, the media sink object rendering or archiving the media content.

* * * * *